(12) United States Patent
Steenstrup et al.

(10) Patent No.: US 7,579,704 B2
(45) Date of Patent: Aug. 25, 2009

(54) WAVE POWER APPARATUS HAVING A FLOAT AND MEANS FOR LOCKING THE FLOAT IN A POSITION ABOVE THE OCEAN SURFACE

(75) Inventors: Per Resen Steenstrup, Charlottenlund (DK); Niels Arpe Hansen, Esbjerg (DK); Keld Hansen, Gesten (DK)

(73) Assignee: Wave Star Energy APS, Charlottenlund (DK)

( * ) Notice: Subject to any disclaimer, the term of this patent is extended or adjusted under 35 U.S.C. 154(b) by 424 days.

(21) Appl. No.: 10/575,726

(22) PCT Filed: Oct. 14, 2004

(86) PCT No.: PCT/DK2004/000705

§ 371 (c)(1),
(2), (4) Date: Dec. 18, 2006

(87) PCT Pub. No.: WO2005/038248

PCT Pub. Date: Apr. 28, 2005

(65) Prior Publication Data

US 2007/0102937 A1    May 10, 2007

(30) Foreign Application Priority Data

Oct. 14, 2003   (WO) ..................... PCT/DK03/00693

(51) Int. Cl.
*F03B 13/10*   (2006.01)
(52) U.S. Cl. .............................. 290/53; 290/42; 290/43; 290/54; 60/498
(58) Field of Classification Search .................. 290/53, 290/42, 43; 60/498
See application file for complete search history.

(56) References Cited

U.S. PATENT DOCUMENTS

| 589,520 | A | 9/1897 | Wright |
| 625,101 | A | 5/1899 | Essington |
| 639,734 | A | 12/1899 | Johnson |
| 1,823,190 | A | 9/1931 | Christie |
| 2,848,189 | A | 8/1958 | Caloia |

(Continued)

FOREIGN PATENT DOCUMENTS

FR   2 532 691 A   3/1984

(Continued)

*Primary Examiner*—Nicholas Ponomarenko
*Assistant Examiner*—Iraj A Mohandesi
(74) *Attorney, Agent, or Firm*—Birch, Stewart, Kolasch & Birch, LLP

(57) ABSTRACT

A wave power apparatus includes at least one rotationally supported arm (122) which carries a float (124) at its free end, so that a translational movement of the float caused by a wave results in rotation of the arm (122). The apparatus comprises power conversion means for converting power transmitted from the wave to the arms into electric power, e.g. a hydraulic system, in which a hydraulic medium is displaced by the movement of the arm, the hydraulic system being coupled to an electric generator. The apparatus comprises a hydraulic lifting system for lifting the float out of the ocean and for locking the float in an upper position above the ocean surface, e.g. during extreme sea wave conditions, such as storm. The lifting system may comprise at least one pump for pumping hydraulic cylinders for lifting the arm out of the ocean.

28 Claims, 23 Drawing Sheets

U.S. PATENT DOCUMENTS

| | | |
|---|---|---|
| 4,013,382 A | 3/1977 | Diggs et al. |
| 4,092,828 A | 6/1978 | Garza |
| 4,223,962 A | 9/1980 | Zielfleisch et al. |
| 4,453,894 A | 6/1984 | Ferone et al. |
| 4,792,290 A | 12/1988 | Berg |
| 5,084,630 A | 1/1992 | Azimi |
| 5,921,082 A | 7/1999 | Berling |
| 5,986,349 A | 11/1999 | Eberle et al. |
| 6,476,511 B1 | 11/2002 | Yemm et al. |
| 7,459,802 B2 * | 12/2008 | Loui et al. .............. 290/53 |
| 7,468,563 B2 * | 12/2008 | Torch .................... 290/42 |
| 2003/0110767 A1 | 6/2003 | Lee |

FOREIGN PATENT DOCUMENTS

| | | |
|---|---|---|
| GB | 2 062 130 A | 5/1981 |
| WO | WO-89/07197 A | 8/1989 |
| WO | WO-01/92644 A1 | 12/2001 |

\* cited by examiner

WAVE POWER APPARATUS HAVING A FLOAT AND MEANS FOR LOCKING THE FLOAT IN A POSITION ABOVE THE OCEAN SURFACE

TECHNICAL FIELD

The present invention relates to a wave power apparatus for converting power of sea or ocean waves into useful energy, such as electricity. The apparatus according to the invention is specifically designed to withstand extreme sea wave conditions occurring during storms and hurricanes.

BACKGROUND OF THE INVENTION

It is well known that sea waves appear to constitute a nearly unlimited resource of energy which, if exploited efficiently, may possibly solve a significant proportion of the world's energy problems. However, despite of many attempts to exploit sea-wave energy, no commercially successful system for converting sea wave energy into electrical power has been devised so far.

In general, three different types of wave power apparatuses have been proposed in the prior art. One such apparatus is disclosed in U.S. Pat. No. 6,476,511, the apparatus comprising a plurality of buoyant cylindrical body members connected together at their ends to form an articulated chain-like structure. Each pair of adjacent cylindrical members is connected to each other by a coupling member, which permits relative rotational movement of the cylindrical members about a transverse axis. Adjacent coupling members may permit relative rotation about mutually orthogonal transverse axes. Each coupling member is provided with elements, such as a set of hydraulic rams, which resist and extract power from the relative rotational movement of the body members. The apparatus floats freely in the sea surface and is moored to the sea floor.

A second type of wave power apparatus comprises one or more surface floats capable of moving along the surface of the sea under the action of waves, and a reference member, which is fully submerged in the sea at a certain depth, and which is substantially unaffected by the waves, cf. for example U.S. Pat. No. 4,453,894. The movement of the float in the surface of the sea causes the displacement of a hydraulic fluid in a hydraulic system comprising hydraulic devices which interconnect the surface float or floats and the reference member, whereby useful energy may be extracted from the hydraulic system. It will be appreciated that this apparatus is also moored to the sea floor.

Finally, a third type of wave power apparatus is one having one or more arms supported by a supporting structure carrying one or more floats which are caused to move by the waves. The energy of moving waves transmitted into the arms and may be conveyed into a hydraulic system, as in the system of U.S. Pat. No. 4,013,382, or into a mechanical system of shafts which, via a mechanical transmission system, drive one or more electric generators for the production of electricity, as in the system of WO 01/92644.

The present invention is generally concerned with the third type of wave power apparatuses mentioned above. It has been found that one general problem in such systems is to prevent extreme impacts occurring during storms and hurricanes from damaging the floats, arms and other parts of the wave power apparatuses. It is therefore an object of preferred embodiments of the present invention to provide a wave power apparatus, which is capable of withstanding extreme sea wave conditions. It is a further object of preferred embodiments to provide a wave power apparatus which may conveniently be taken out of operation, e.g. to prevent formation of ice on various parts of the apparatus during operation. It is a still further object of preferred embodiments of the invention to provide an apparatus, which allows for convenient maintenance access to arms and floats, most preferably to allow for maintenance access of individual arms and floats in systems comprising a plurality of arms, each provided with a float.

SUMMARY OF THE INVENTION

The present invention accordingly provides a wave power apparatus comprising at least one arm, which is rotatably supported at one end by a shaft, and which carries a float at its other end, which is opposite to the supported end, so that a translational movement of the float caused by a wave results in rotation of the arm around the shaft, the apparatus comprising power conversion means for converting power transmitted from the wave to the arms into electric power, the wave power apparatus being characterised by a hydraulic lifting system for lifting the float out of the ocean and for locking the float in an upper position above the ocean surface.

Thanks to the hydraulic lifting system, the float may be withdrawn from the ocean and kept in a locked position above the ocean surface at the occurrence of e.g. storm or prior to the occurrence of icing. Thus, the only impact on the float when it is withdrawn from the ocean is the impact of wind, the forces of which are significantly smaller than the forces of waves. In one embodiment, the arms may be lifted out of the water by generating a hydraulic pressure in the hydraulic lifting system, which causes the arms to be displaced out of the ocean, and by appropriately shutting a valve, preferably by means of a conical locking pin, so as to maintain the lifting pressure. The hydraulic lifting system may be controlled from a remote on-shore location, or by a control system which forms part of the wave power machine, and which acts in response to a signal indicative of a stormy condition, e.g. to a signal from an electronic device for continuously determining the velocity of wind. The control system may be programmed to withdraw the float and arm from the water at a predetermined wave height. For example, this wave height may be a certain fraction, e.g. 30%, of the largest predicted wave referred to the operation site of the apparatus, the so-called "100-year wave". At an ocean depth of 20 m, this height is approximately 18 m, and the control system accordingly takes the float and arm out of the ocean at a wave height of approximately 6 m. The wave height may be determined by a mechanical, optical, electro magnetic or acoustical system, e.g. a pressure transducer system with a pressure transducer arranged on the sea floor, an echo sound system arranged at the floats, an echo sound system arranged on a fixed supporting structure of the apparatus and pointing upwards towards the surface of the waves, or operating in air pointing downwards toward the water surface, or a sensor system with light transmitting or light receiving means arranged on the floats and/or on the fixed supporting structure, such light being, e.g., laser light. Alternatively, there may be provided a radar system at the structure. The pressure of a hydraulic medium in the lifting system may be generated by a pump forming part of the hydraulic lifting system. Alternatively, the pressure may be generated by releasing pressurised hydraulic medium from an appropriate hydraulic accumulator. The accumulator may e.g. be charged by a hydraulic driving system which, in one embodiment of the invention, is comprised in the power conversion means. For example, the accumulator for delivering the hydraulic lifting pressure may be an accumulator, or a plurality of accumulators in a so-called accumulator battery, for forcing the float into the wave at a wave trough as described in detail below.

In preferred embodiments, the apparatus comprises a plurality of arms, each provided with a float. In such embodiments, the hydraulic lifting system is preferably adapted to individually lift each float out of the ocean. For example, the lifting system may comprise a plurality of hydraulic circuits, each of which is associated with one of the arms, and each of which comprises valve and/or pump means for pressurising the hydraulic circuit for lifting the arm and float out of the ocean. In one embodiment the hydraulic lifting system comprises fewer pumps than circuits, so that the or each pump is connected to a plurality of circuits, each circuit with associated valves being designated to one arm. In preferred embodiments of the invention, the power conversion means and the arms are arranged such that those arms, which are kept in the ocean, may deliver power to the power conversion means, while one or more other arms are kept lifted out of the ocean. Embodiments incorporating the power conversion means of WO 01/92644, which is hereby incorporated by reference, may allow for free-wheeling, around a driving shaft of the power conversion means, of arms which are lifted out of the ocean. Embodiments relying on hydraulic power conversion means, in which movement of the arms generates pressure in a hydraulic driving system, may comprise means for taking out of operation those power conversion means, e.g. those hydraulic actuators, which are associated with an arm, which has been lifted out of the ocean. In a presently preferred embodiment, an arm may be lifted out of the ocean and locked in an elevated position by the arm's actuator, e.g. a double-acting cylinder, which may be used to lift and lock the arm.

Preferred embodiments of the present invention also provide a solution to the problem of providing a stable rotational support of the arm or arms, which is less vulnerable to horizontal force components. It has been found that the structure of U.S. Pat. No. 4,013,382 is likely to become unstable due to horizontal force components generated by waves. More specifically, the bearings of the connecting rods are constituted by simple pins, and any slight slack in such bearings might cause irreparable damage to the connecting rods and their support. The apparatus of U.S. Pat. No. 4,013,382 is therefore unsuitable for installation at the open sea, i.e. at relatively large wave forces. The structure disclosed in WO 01/02644 also suffers from the disadvantage that even the slightest slack in the one-way bearings which support the rocker arms and which connect the rocker arm pipes and the force shaft might damage the bearings. Moreover, the apparatus of WO 01/02644, in which a total of some 40 rocker arms are supported by one single force shaft, requires an immensely strong force shaft which, due to its dimensions required in order for it to be able to transmit the required power, would be unfeasible due to its weight conferred by its large dimensions, such large dimensions being necessary due to the momentum transmitted from the arms to the force shaft. Preferred embodiments of the apparatus according to the present invention provide an improved support of the arms which makes the apparatus less vulnerable to horizontal force components. Therefore, in a preferred embodiment, the apparatus of the invention comprises a pair of pre-stressed and essentially slack-free bearings. The bearings are thus capable of efficiently counteracting radial and axial forces and consequently to withstand horizontal force components conferred by waves. The term "slack-free bearing" should be understood to comprise any bearing, which is slack-free in a horizontal and axial direction. For example, the pair of bearings may comprise two conical bearings with their conical faces being opposite to each other. In one embodiment, the bearings are pressure-lubricated.

In another embodiment, the bearing comprises an inner and an outer ring or cylinder, the inner ring being secured to a rotational shaft of the arm, and the outer ring being secured to a fixed support, the bearing further comprising a flexible material between the inner and the outer ring. During operation, the inner ring rotates relative to the outer ring, thereby twisting the flexible material. In order to adjust the stiffness of the flexible material, there may be provided at least one cavity or perforation in the material. The flexible material may, e.g., comprise a spring member, such as a flat spring. By appropriate positioning of the perforation(s) or by appropriate design of the spring member(s), the bearing support may be designed to have a larger force-bearing capacity in one direction than in another direction.

The arm is preferably supported by the bearings at two mounting points which are offset from a centre axis of the arm, the centre axis of the bearings being coincident with an axis of rotation of the arms. As each arm is connected to and supported by individual bearings, a stable rotational support for the arms is achieved. In particular, as the two bearings are preferably arranged at a mutual distance along the axis of rotation of the arm, an impact at the axis resulting from a horizontal force component on the float may be counteracted.

It will, accordingly, be appreciated that the structure of the present apparatus is more stable than the structure of prior art devices. As the present apparatus is primarily intended as an off-shore construction, stability is a major concern due to costs of maintenance at off-shore sites. Maintenance costs at off-shore sites are typically on average 10 times higher than maintenance costs at on-shore sites.

In the apparatus according to the invention, there is preferably provided a plurality of arms which are arranged in a row such that a wave passing the row of arms causes the arms to successively pivot around the axis of rotation. The arms are preferably arranged at mutual distances, so that at all times at least two of the arms simultaneously deliver a power contribute to the power conversion means. The power conversion means preferably comprise a hydraulic actuator associated with each arm, the hydraulic actuators feeding a hydraulic medium into at least one hydraulic motor via shared hydraulic conduits. Accordingly, an even power output of the power conversion means may be achieved. This is in particular the case in embodiments of the apparatus comprising a large number of arms, floats and actuators, e.g. 60, as the sum of the power contributes of the individual actuators is essentially constant over time. Possible pressure ripples on the pressure side of the hydraulic motor may be essentially eliminated by means of a spike suppression device which is known per se, the spike suppression device being arranged in fluid communication with the shared hydraulic conduits. Preferably, the sum of all power contributes is essentially constant at a certain wave climate, i.e. wave height and wave frequency. The hydraulic motor is preferably a hydraulic motor with variable displacement volume per revolution. Changes in the wave climate may be compensated by means of a control circuit which controls the displacement volume per revolution of the motor in order to keep the rpm of the motor essentially constant. In order to generate alternating current at a given frequency without utilizing a frequency converter, the rpm of the motor should be controllable within +/−0.1-0.2%. In case a different type of hydraulic motor is applied or in case the rpm is not controlled exactly, a frequency controller may be employed for fine-adjustment of the frequency of the AC current generated.

In preferred embodiments, the apparatus of the present invention comprises at least 5 arms, such as at least 20 arms, preferably at least 40 arms, preferably 50-80 arms, such as 55-65 arms, e.g. 60 arms. The arms of the apparatus are preferably distributed, such that there is provided at least five arms, preferably at least 10 arms, per wavelength of the ocean waves. At the open sea, the wave length of the ocean waves is typically 50-300 m, such as 50-200 m. In protected waters, the wave length of waves is typically 5-50 m.

In preferred embodiments, the apparatus spans over at least two wave lengths. This brings about the possibility to arrange a row of arms and floats at a relatively large angle with respect to the wave heading, e.g. at +/−60°, as the wave length projected onto the orientation of the row of floats spans over at least 2×cos(60°) wavelengths, i.e. at least one wavelength, whereby it is ensured that a power contribute is delivered at all times.

The plurality of arms are preferably arranged in one or more rows, e.g. in a star, V or hexagon formation as disclosed in WO 01/92644. In order to efficiently exploit the wave energy, the row of arms is preferably oriented such with respect to the wave heading that the row forms an angle of within +/−60° with respect to the wave heading.

It has been found that the efficiency of the apparatus according to the invention increases with increasing buoyancy of the float with regard to its dry weight. Accordingly, in preferred embodiments of the invention, the buoyancy of the float is at least 10 times its dry weight, such as at least 20, 30 or 50 times, preferably 20-40 times. For example, the dry weight of a float is typically 100 kg or less pr. meter cube of buoyancy, the buoyancy of salt water being typically approximately 1050 kg/m$^3$. A float is typically made from hard low weight foam materials or balsa wood, which are coated with a composite, such as reinforced glass fiber composites or a combination of glass fiber and carbon fiber composites. Alternatively, a float may be made from a sandwich layer of reinforced fiber material with hard foam being provided in the middle of the sandwich and at the bottom and at the top of the float, with the foam layers being separated by a honeycomb structure of reinforced fiber materials.

Efficiency also increases with increasing diameter of the float relative to its height. Preferably, the diameter of the float is at least 5 times its height, such as at least 7 times, such as at least 10 times, or 5-20 times. In preferred embodiments, the float has an essentially circular cross-section, and in order to improve fluid dynamical properties of the float, it may have a rounded edge portion, which acts as a streamlining.

The power conversion means preferably comprise a hydraulic driving system with a hydraulically driven motor. For example, each arm may be connected to the hydraulic driving system by means of at least one actuator which causes a hydraulic medium of the hydraulic driving system to be displaced into a hydraulic motor, the actuator(s) being arranged to displace the hydraulic medium to the motor via hydraulic conduits. In case of several arms and several actuators, the hydraulic medium is preferably displaced to the motor via shared hydraulic conduits. In other words, several hydraulic actuators may feed hydraulic medium into one single hydraulic motor via a shared system of hydraulic conduits. Most preferably, the hydraulic medium is not accumulated in a hydraulic storage tank for accumulating hydraulic medium under pressure, from which pressure is released to the motor. Accordingly, the actuators feed hydraulic medium directly into the hydraulic motor. However, as discussed below, a battery of hydraulic accumulators may advantageously be applied for an entirely different purpose, i.e. for forcing a float into a wave near a wave trough. As in preferred embodiments, a plurality of actuators simultaneously transmit power to the motor, there is no need for a hydraulic storage tank, as the motor will be capable of running at a substantially constant speed and at a substantially constant power input thanks to the delivery of power in the shared hydraulic system from a plurality of actuators at a time.

It should be understood that there may be foreseen more than one single hydraulic motor. Preferably, two, three or more motors may be arranged in parallel at the end of the shared hydraulic conduit. Thus, the power delivered through the shared hydraulic conduit may drive several motors. If, for example the hydraulic driving system produces 4 MW, eight motors delivering 500 kW each may be coupled in parallel at the shared hydraulic conduit. The motors may deliver the same nominal power output, or they may deliver different nominal power outputs. For example, one motor may deliver 400 kW, one may deliver 500 kW, etc.

All hydraulic motors may also be linked through the same through-going shaft, which drives at least one common electric generator, or all hydraulic motors may drive one cog wheel which drives at least one common electric generator In order to allow the hydraulic system to force the arm(s) and float(s) in any desired direction, each actuator may comprise a double-acting cylinder which may be used to extract energy from the arm into the hydraulic system and to feed energy from the hydraulic system into the arm, e.g. to drive the float into a wave near a wave trough as explained in detail below in connection with the hydraulic accumulators. The hydraulic lifting system preferably comprises one or more pumps for pumping hydraulic medium into the cylinders for lifting them out of the ocean.

In preferred embodiments, the apparatus comprises means for forcing the float(s) into the waves at wave troughs, so as to increase the vertical distance traveled by the float to increase the power output in a wave cycle. Such means may e.g. comprise one or more hydraulic accumulators for intermittently storing energy in the hydraulic driving system. The energy stored in the hydraulic accumulators may advantageously be derived from the release of potential energy as the float is taken out of the water a wave crest. In other words, as a float moves from a submerged position in a wave near a wave crest to a position above water, potential energy is released. This energy may be accumulated in the accumulator or in a battery of accumulators, wherein different accumulators are charged at different pressures, e.g. at pressure steps according to the number of accumulators. In embodiments incorporating such hydraulic accumulators, the hydraulic driving system may be controllable to release the energy stored in the accumulator(s), when a float is passed by a wave trough, so as to drive the float carried by the arm into the wave. To improve the efficiency of the accumulator system, there may be employed a plurality of accumulators, such as at least 2, such as 3-20, such as typically 6-12, which preferably store hydraulic medium at different pressure steps. In preferred embodiments, the float is driven a certain distance into the wave near a wave trough, and subsequently the float is allowed to move upwardly in the wave, but yet submerged in the wave, and at the wave crest the float is released, i.e. allowed to move out of the water. As described above, the energy released as the float is released at the wave crest is used to charge the one or more hydraulic accumulators, at which energy is stored for driving the float into the wave. Accordingly, the potential energy released as the float moves out of the wave near the wave crest is not lost. On the contrary, it is utilized for driving the float into the wave at the wave trough, whereby the total vertical distance traveled by the float is increased. Consequently, the power output of a wave cycle is increased. It is estimated that, at a wave height of 1.5 m, the vertical distance traveled by the float may be increased from approximately 0.75 m to approximately 1.5 m, thus doubling the power output. The energy utilized to drive the float into the wave at the wave trough causes essentially no loss in the driving system, as the energy is provided by the release of the float at the wave crest.

In order to allow for accurate control of the system, each cylinder, or at least selected ones of the cylinders, may be provided with a sensor for determining a position and/or rate of movement of the cylinder's piston, the sensor being arranged to transmit a signal to a control unit of the cylinders and associated valves, so that the transmission of energy from the individual cylinders to the remaining parts of the hydraulic driving system is individually controllable in response to the signal representing the individual cylinder's piston's position and/or rate of movement. Thus, the cylinders may be individually controllable, and a cylinder may be withdrawn from operation, e.g. for maintenance, while the remaining cylinders keep operating, so that the entire system will be essentially unaffected by the withdrawal of a single cylinder. The sensor is preferably also utilized to control the depressing of the float into the water, i.e. to control release of pressure of the battery of accumulators as described above. The sensor may further be utilized to control charging of the accumulators, i.e. to determine the passage of a wave crest. Moreover, the sensor is useful to control releasing of the float at a wave crest, i.e. to prevent a catapult-like shoot-out of the float. The sensor may also be used for monitoring the power output of each individual actuator in the hydraulic driving system, so that the power output of the individual actuators and the entire apparatus as such may be optimized.

Whereas some prior art systems rely on submerged reference members for supporting those means which convert sea wave power into useful power or on shore-supports, it has been found that wave energy is most efficiently exploited on the open sea. Accordingly, the apparatus of the invention preferably comprises a supporting structure which is fixed to the sea floor. In a presently preferred embodiment, the supporting structure is fixed to the sea floor by means of a suction anchor, or alternatively by a gravity foundation, or fixed to a rocky seabed with studs. The supporting structure may advantageously comprise a truss structure, with the suction anchor being arranged at a first nodal point of the structure. At least one arm and preferably all arms of the apparatus are supported at second nodal points of the truss structure, most preferably at a summit of a triangular substructure of the truss structure. The triangular substructure may define two vertices at the sea floor, with a means for attaching the structure to the sea floor in each of the corners. Preferably, the means for attaching are at least partially embedded in the sea floor, e.g. under by gravity foundation or a suction anchor. As the means for attaching are arranged at the nodal points of the truss structure, vertical forces in the truss structure caused by the buoyancy of the floats may efficiently be counteracted. A truss structure as described above ensures a maximum degree of stability of the system while allowing for a low overall weight of the supporting structure.

BRIEF DESCRIPTION OF THE DRAWINGS

Preferred embodiments of the invention will now be further described with reference to the drawings, in which.

DETAILED DESCRIPTION OF THE DRAWINGS

Figure 1:
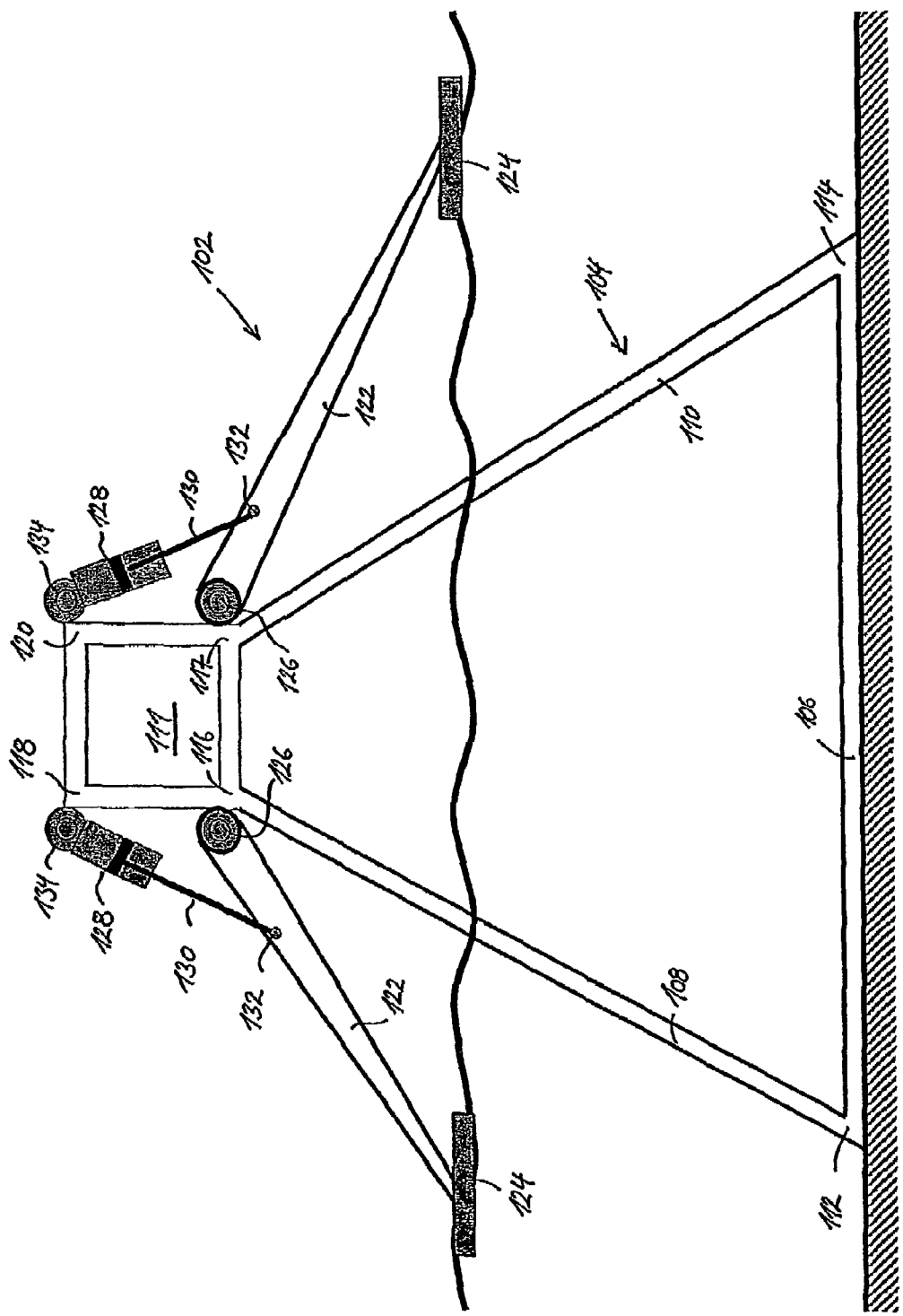
FIGS. 1 and 2 are cross-sectional illustrations of an embodiment of a wave power apparatus according to the invention.
Figure 2:
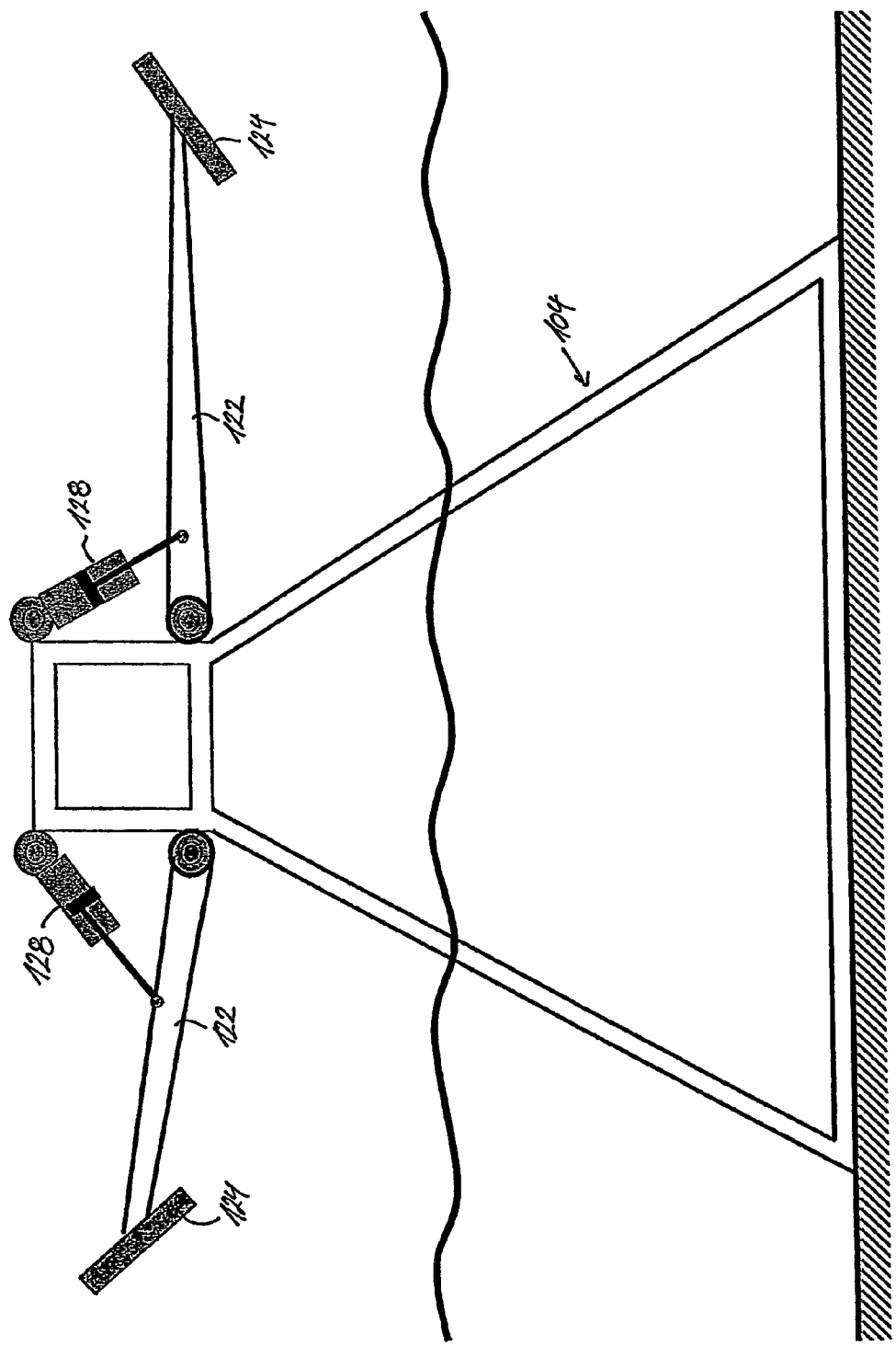
Figure 3:
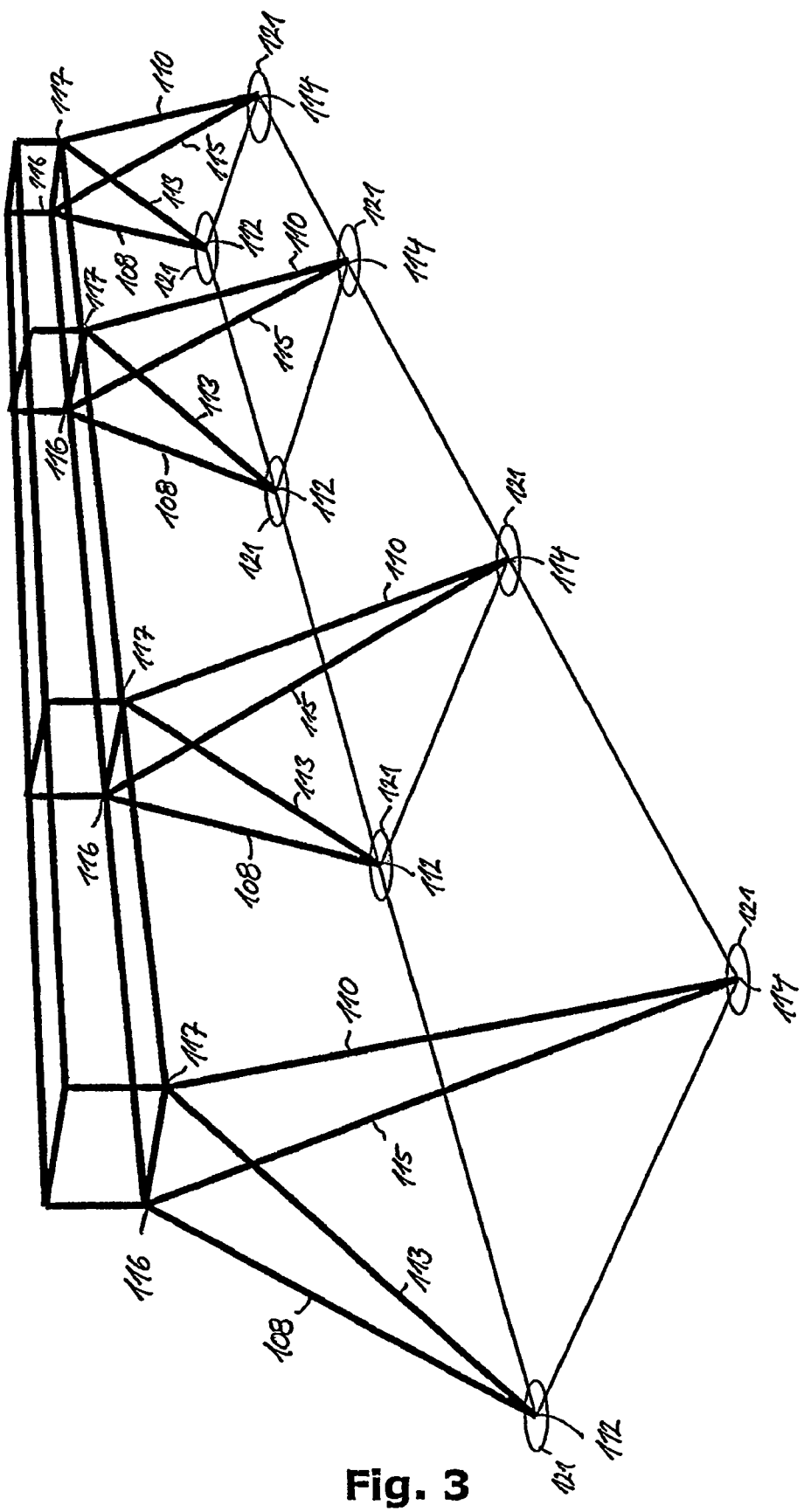
FIGS. 3-5 show three embodiments of a truss structure of an embodiment of the wave power apparatus according to the present invention.
Figure 4:
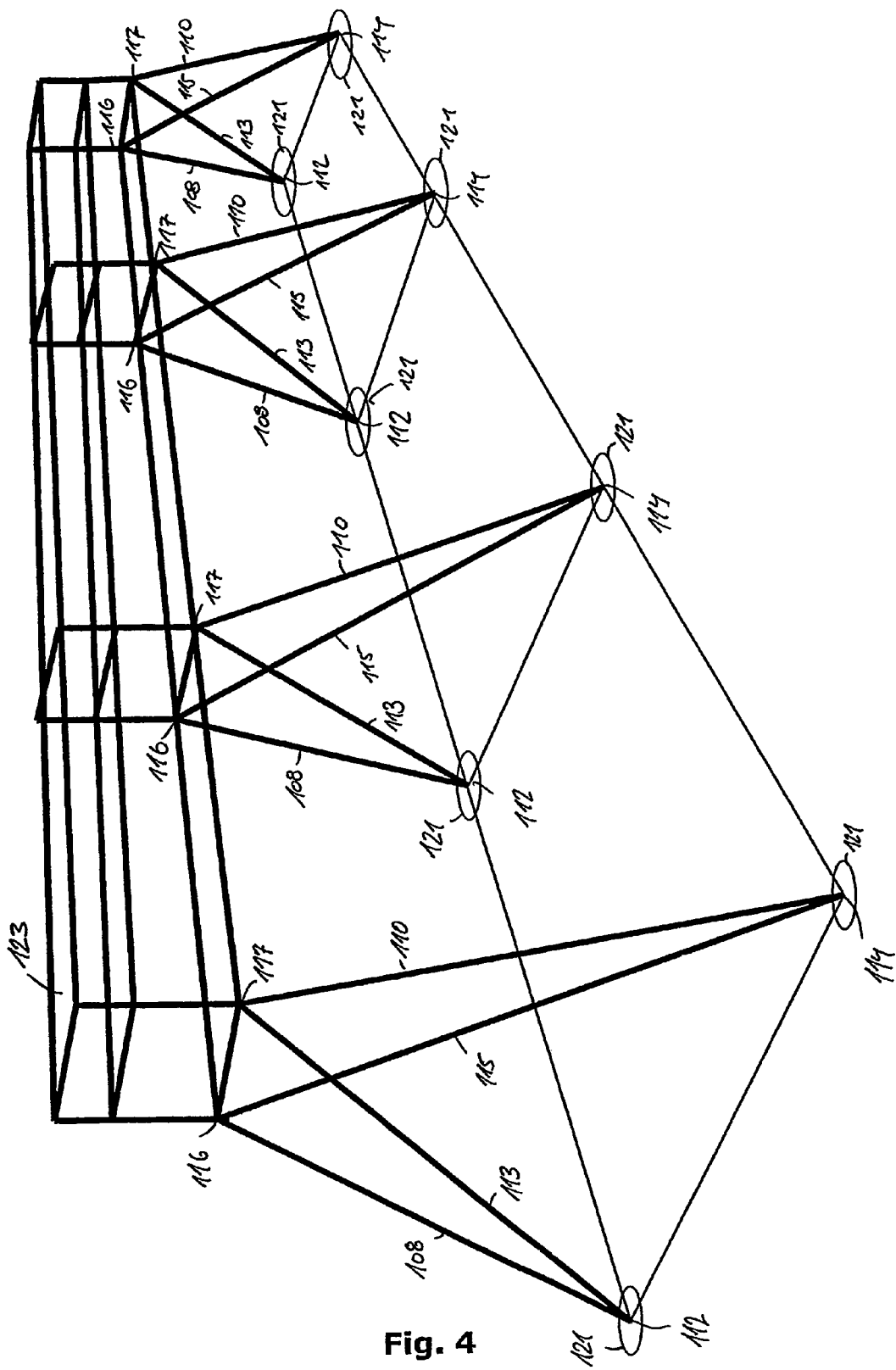
Figure 5:
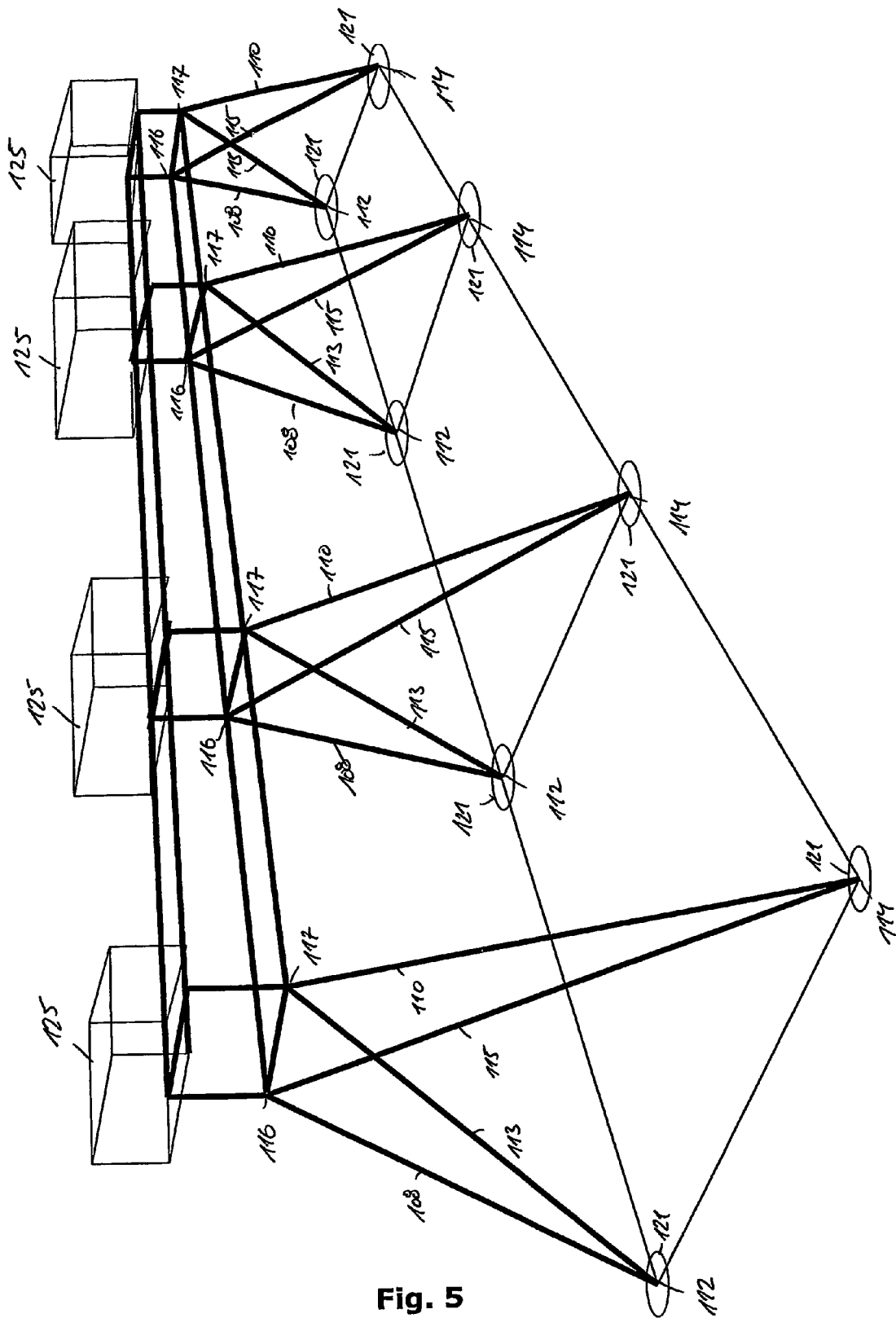

FIGS. 1 and 2 show a cross-section of wave power apparatus 102 comprising a truss structure 104 which may e.g. be of a so-called space truss structure. The truss structure, which is also illustrated in FIGS. 3-5, comprises an essentially triangular lower part with first, second and third force members 106,108,110, and an essentially rectangular upper part 111. As illustrated in FIGS. 3-5, the rectangular upper part extends a distance perpendicular to the plane of FIGS. 1 and 2, whereas there is provided a plurality of distinct lower triangular lower parts. The rectangular upper part may be used for accommodating hydraulic and electric equipment, including the hydraulic driving and lifting system, and it may further be used as a as catwalk or footbridge for maintenance personnel. The truss structure-defines first, second, third, fourth, fifth and sixth nodal points 112,114,116,117,118 and 120. Preferably, the force members are essentially rigid, so that they may withstand tension and compression. The first and second nodal points 112,114 are provided at the sea floor and are retained at the sea floor by means of, e.g., suction anchors 121 indicated in FIGS. 3-5. Alternatively the first and second nodal points 112,114 may be supported by a concrete foundation at the sea floor. Arms 122 carrying floats 124 are rotationally supported at or near the third and fourth nodal points 116, 117. FIGS. 3-5 show a perspective view of the truss structure for supporting a plurality of arms on either side of the structure. It should be understood that the truss structure of FIGS. 3-5 may have a wider extent than actually depicted in FIGS. 3-5, so that it comprises e.g. twenty or thirty triangular sections, whereby an arm may extend away from the truss structure at each of the nodal points 116,117. A plurality of truss structures as those of FIGS. 3-5, such as three, six or more truss structures, may be arranged in a star, V-or hexagonal arrangement in order to increase the number of arms and floats included in an installation comprising the apparatus of the invention or a plurality of apparatuses according to the invention.

The third, fourth, fifth and sixth nodal points 116,117, 118,120 are provided above the surface of the sea at a height sufficient to ensure that they are also above the sea surface when waves are high under stormy conditions. For example, the nodal points 116, 117, 118 and 120 may be provided at 20 meters above the surface of the sea when the sea is smooth. In order to transform the energy of the waves into hydraulic energy, the wave power apparatus 102 comprises a plurality of arms 122, each of which at one end comprises a float 124 and at the opposite end is connected to a shaft 126. The arms are adapted to rotate around the shafts 126. Each arm 122 is attached to a hydraulic actuator, such as a hydraulic cylinder 128 comprising a piston 130. The hydraulic cylinder 128 is pivotally connected to the arm in a first attachment point 132 and to the truss structure 104 in a second attachment point 134. The second attachment point is preferably located at a nodal point, i.e. along an edge portion of an essentially rectangular structure arranged on top of the triangular main structure of the truss structure. The floats 124 move the arms up- and downwardly Influenced by the movement of the waves. When the arms move upwardly and downwardly, the piston 130 is moved, and thus the wave energy is transformed into hydraulic energy which may be converted into useful electric energy as described below in connection with FIGS. 14-18 and 22.

As shown in FIG. 2 the hydraulic cylinders 128 are adapted to lock the arms 122 in an elevated position wherein waves can not reach the arms 122 and floats 124, the arms being drawn to their elevated positions by the cylinders 128. It is thereby possible to protect the arms 122 and floats 124 during a storm or when ambient temperatures near or below the freezing point of the water of the ocean risk to cause formation of ice on the floats. The hydraulic cylinders 128 are connected to a hydraulic lifting system for locking the hydraulic cylinder in the elevated position, the hydraulic lifting system being discussed in further detail in connection with FIG. 18 below. The floats 124 may be pivotally connected to the arms 122 Accordingly, when the arms are elevated during a storm, the floats may be rotated to a position wherein they are essentially parallel to the wind direction. Thereby, the surface which the wind acts on is limited and thus the force acting on the floats 124 is reduced and the torque transferred to the truss structure 104 via the arms 122 is reduced. Furthermore the floats are designed with an aerodynamic shape with rounded edges (not shown), so as to reduce the wind forces on the apparatus.

As shown in FIGS. 3-5, the truss structure 104 may include diagonal force members 113, 115 (not shown in FIGS. 1 and 2) for providing a further support at the nodal points 116, 117.

In FIGS. 4 and 5, the truss structure is loaded with a weight acting downwardly to reduce the upwards forces at the anchors 121. The weight is brought about by a longitudinally extending weight, such as a water tank 123 (FIG. 4), or by a plurality of distinct weights, such as water tanks 125 (FIG. 5).

Figure 6:
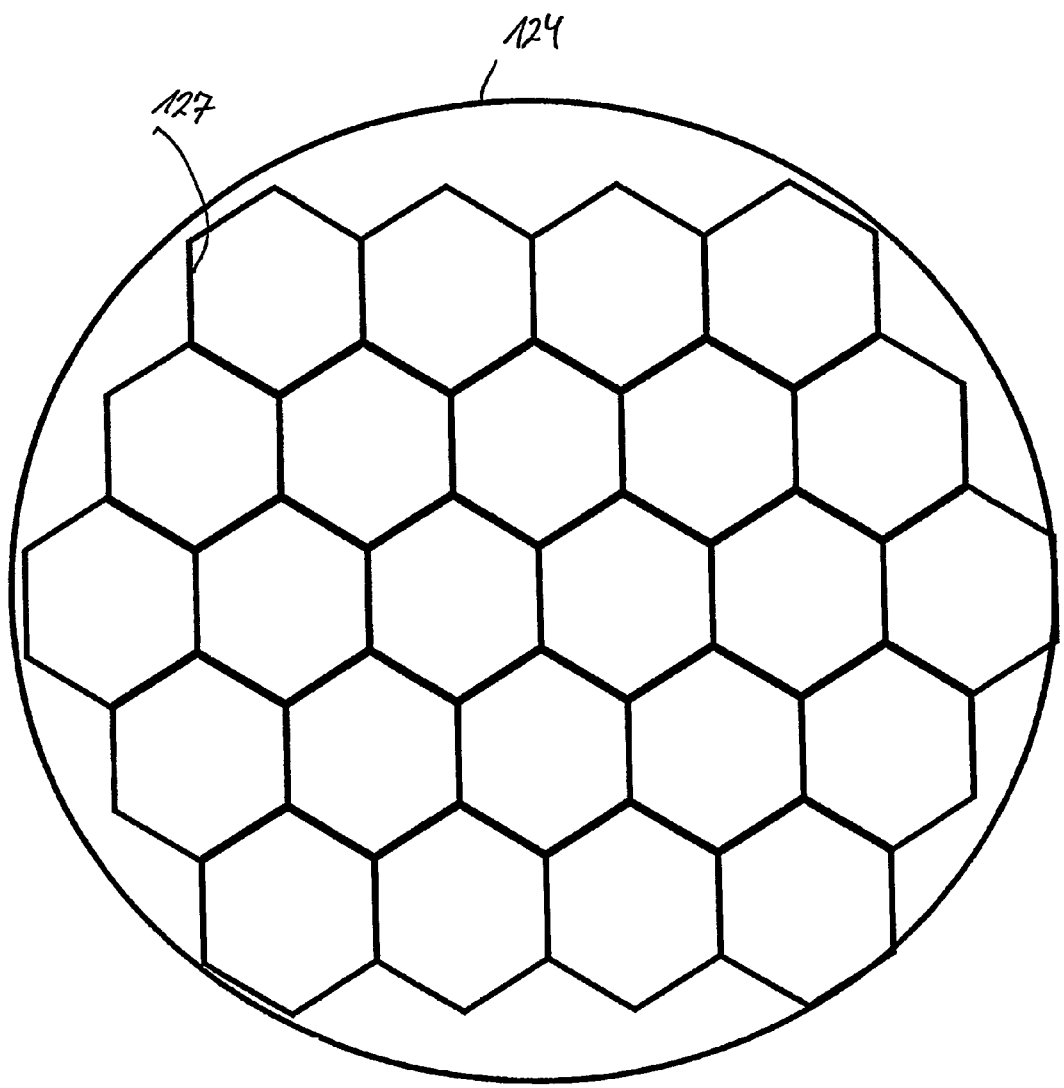
FIG. 6 illustrates a honeycomb structure of a float.

FIG. 6 shows a structure of an essentially hollow float 124 comprising a honeycomb structure 127, which supports the outer walls of the float.

Figure 7:
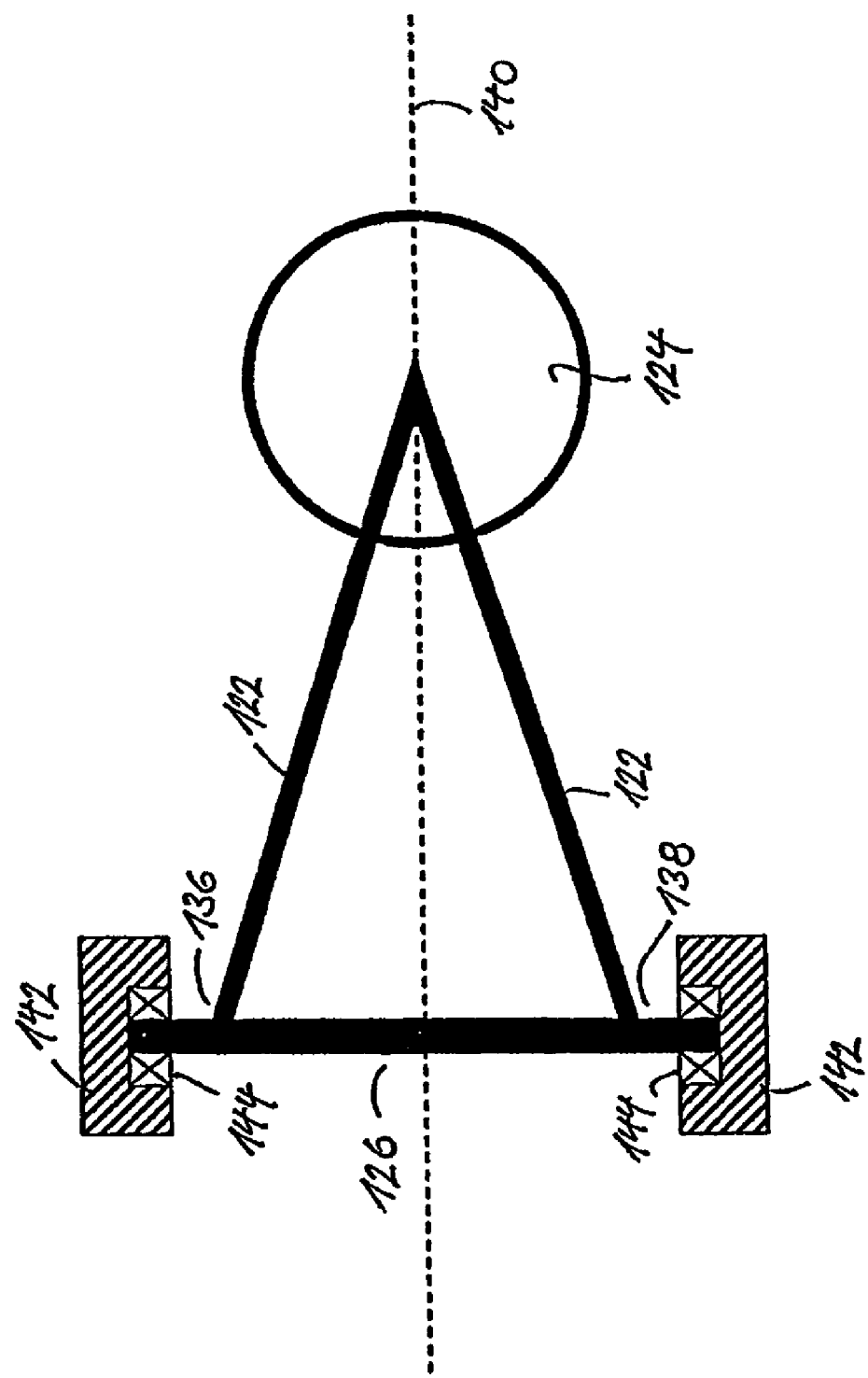
FIG. 7 illustrates a supporting structure for an arm of the apparatus of FIGS. 1 and 2.

FIG. 7 shows one of the arms 122 which is pivotally attached to a float 124 and is adapted to rotate around a shaft 126. The arm is connected to the shaft at first and second attachment points 136, 138 which are offset from the centre axis 140 of the arm. The shaft 126 is rotatably supported by a fixed support structure 142 comprising two bearings 144 arranged to counteract radial and axial forces.

Figure 9:
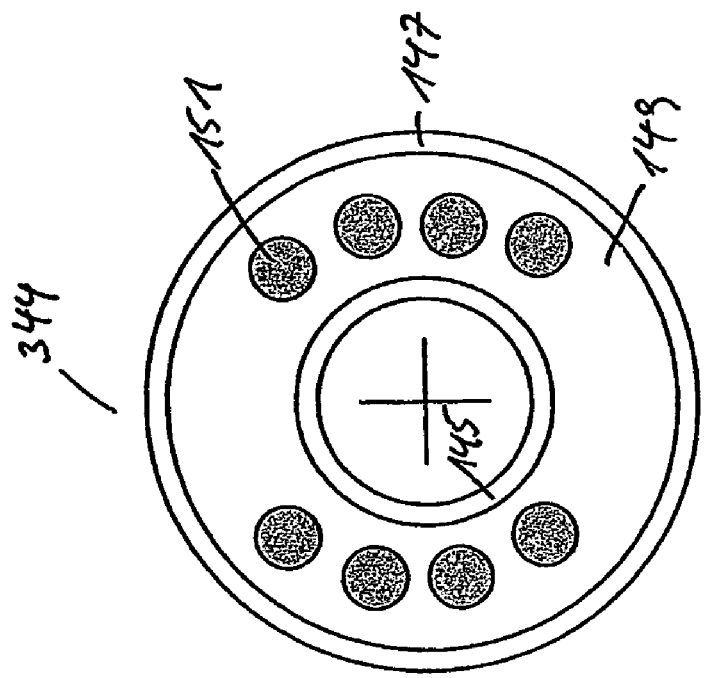
FIGS. 8-13 show various bearing assemblies for an arm of the apparatus.
Figure 8:
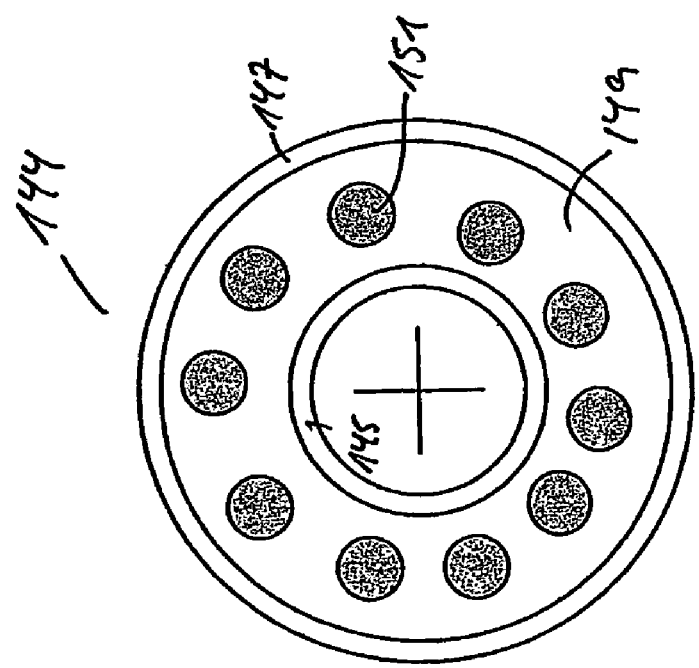

In order to provide an essentially maintenance-free bearing support for the rotation of the arms 122, the present inventors have proposed bearings as those shown in FIGS. 8-13. The bearings of FIG. 8-13 may be incorporated as a bearing 144 in the bearing structure illustrated in FIG. 7 and are particularly well suited for supporting an shaft, the rotational amplitude of which is 30 degrees or less during normal operation, i.e. ±15 degrees or less, such as 20 degrees or less, i.e. ±10 degrees or less. When the arm is to be pivoted to the secured position of FIG. 2, the fixing of the outer ring 147 may be loosened, so that a larger rotational amplitude is allowed, e.g. ±40 degrees. Traditional roller or ball bearings have a short life time at such small rotational amplitudes, as their lubrication medium usually only fulfills its purpose to the desired extent at continuous rotation at a higher rotational speed than the one conferred by the arms 122. The bearing of FIG. 8 includes an inner ring or cylinder 145 and an outer ring or cylinder 147, between which there is provided a flexible substance 149, e.g. a rubber material. The inner ring 145 is secured to the rotating shaft, and the outer ring 147 is secured to the stationary support of the shaft. Thanks to the elasticity of the flexible substance 149, the inner ring may rotate relative to the outer ring, so as to allow the supported shaft to rotate with respect to its support. As the outer ring 147 is supported by or fitted into a fixed structure, e.g. squeeze fitted along its outer periphery, there is provided an axial and a radial support of the shaft. The stiffness of the flexible substance 149 may be adjusted by providing cavities 151, such as bores or perforations, in the material. The maximum load supportable by the bearing may be increased by increasing the length of the bearing (i.e. transverse to the plane of FIG. 8). The number and dimensions of the cavities 151 may be selected to fit a particular purpose, e.g. to minimise notch sensitivity or to maximise the axial force to be counteracted by the bearing. A like bearing 344 is shown in FIG. 9, which has fewer cavities 151 to increase the force-bearing capacity of the bearing in one direction.

Figure 11:
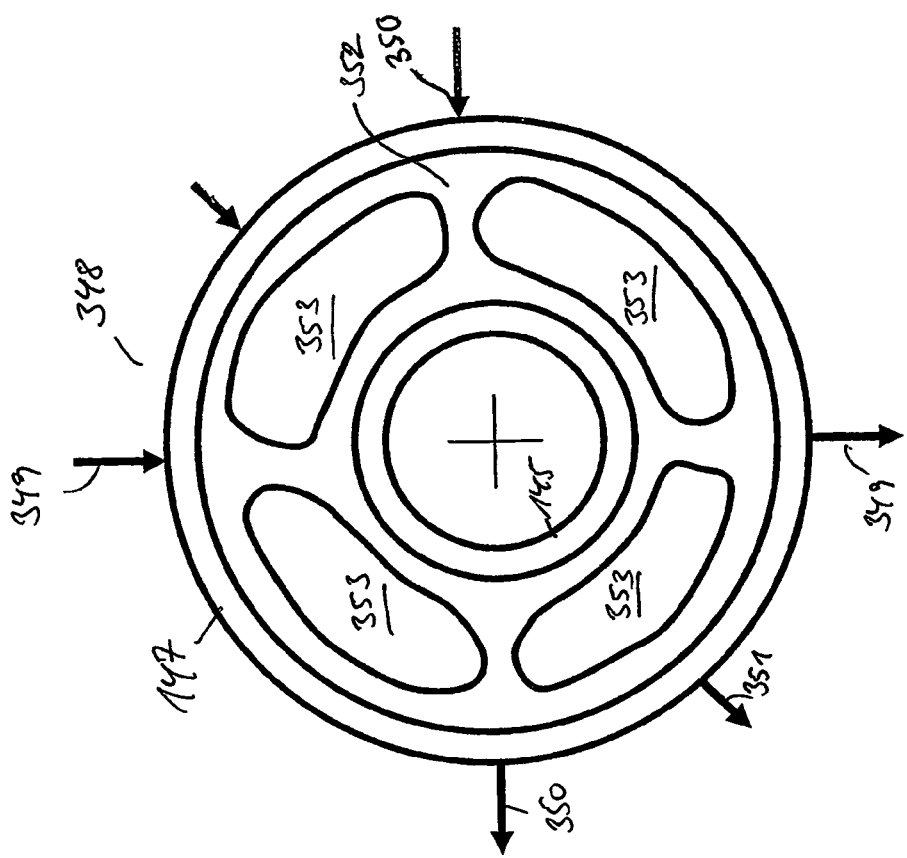
Figure 10:
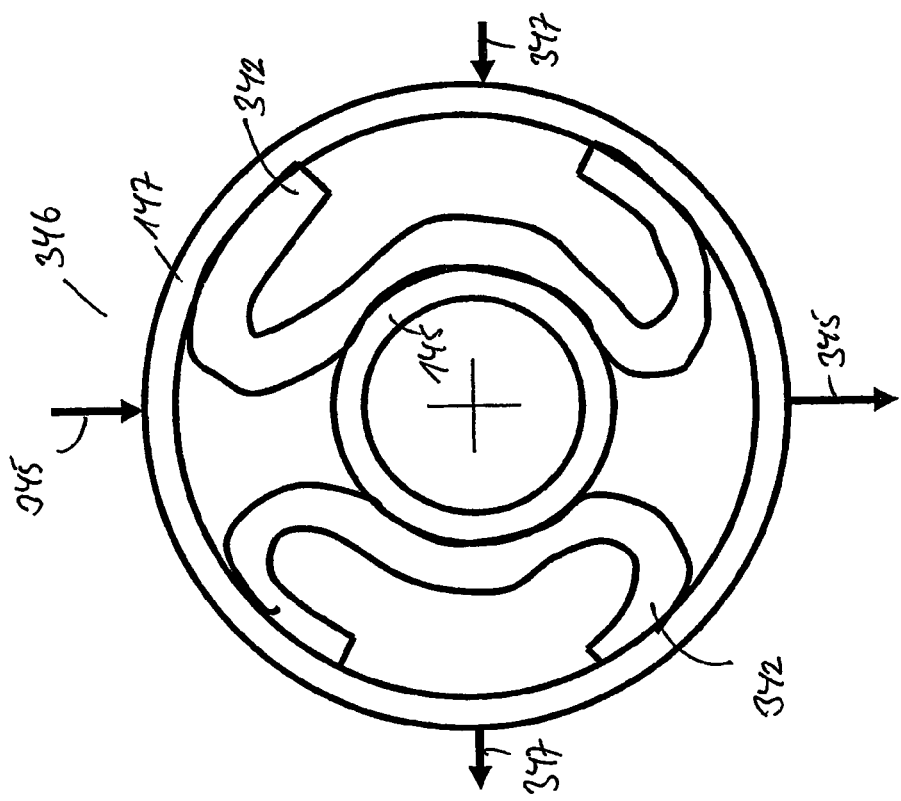
Figure 12:
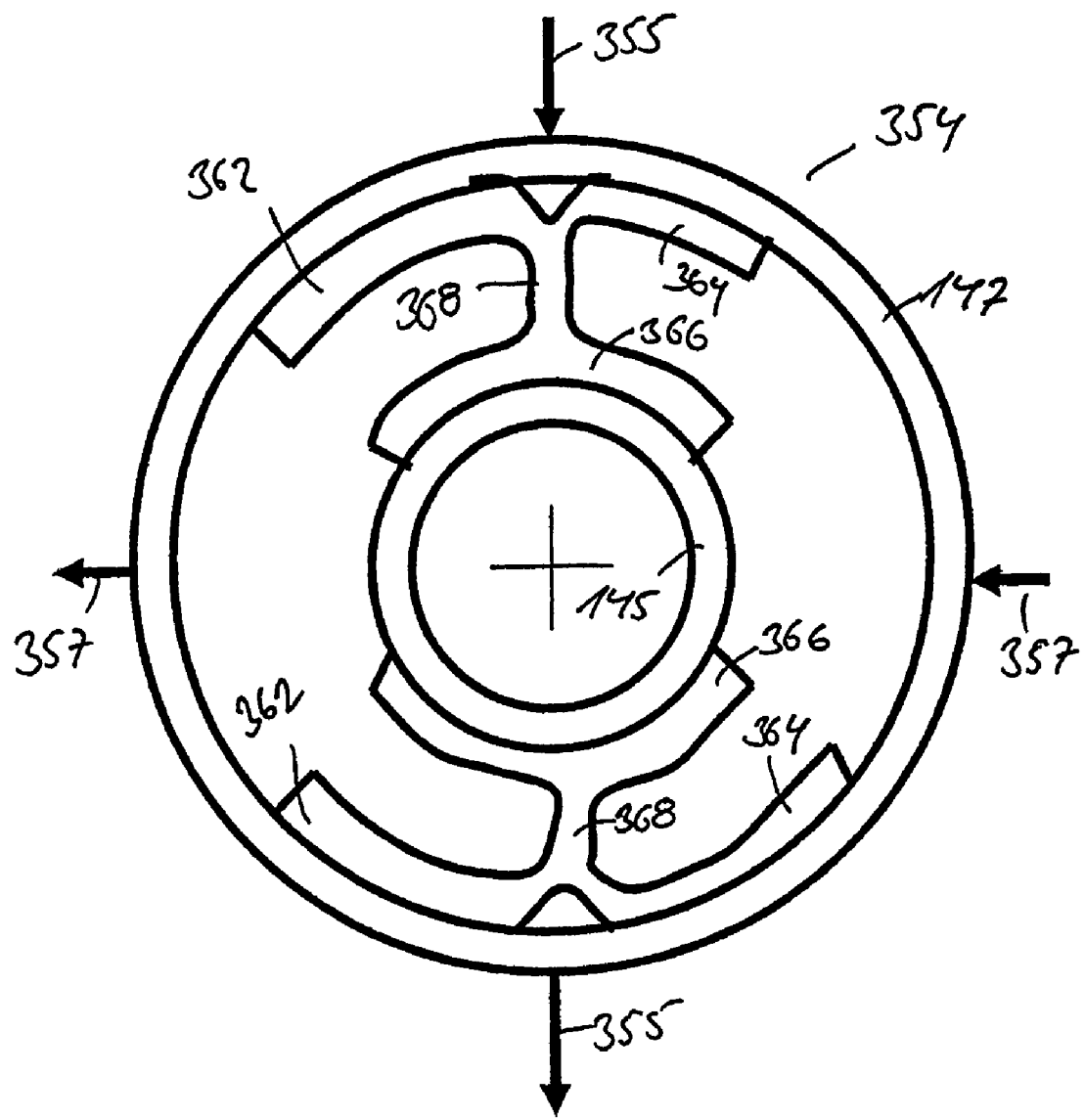

Similar wriggle bearings 346, 348 and 354 are shown in FIGS. 10, 11 and 12, respectively. These bearings comprise inner and outer rings 145, 147 with one or more flat springs being interposed between the rings. In FIG. 10, there is provided two flat springs 147, each of which forms the shape of the number 3. The arrows 345 and 347 indicate that the force-bearing capacity is larger in the vertical direction (arrows 345) than in the horizontal direction (arrows 347). In the bearing 348 of FIG. 11, there is provided one flat spring element 352, which defines a plurality of cavities 353. Arrows 349 and 350 indicate that the force-bearing capacity of the bearing is larger in the vertical and horizontal directions than in non-horizontal and non-vertical directions (arrows 350). Bearing 354 of FIG. 12 comprises two H-shaped flat spring elements 362, each defining an outer and an inner portion 364 and 366 as well as an interconnection portion 368. The stiffness of the bearing may be chosen by adequate selection of the geometry of the spring elements 362. For example, the interconnecting portion 368 may be formed as an S. Arrows 355 and 357 indicate that the force-bearing capacity is larger in the vertical direction than in the horizontal direction.

The inner and outer rings 145, 147 of FIGS. 8-12 may be made from steel or from carbon fibre materials. The flat springs 342, 352 and 362 may likewise be made from steel or carbon fibre materials.

The bearing principles of FIGS. 8-12 may also be used for providing a support for the hydraulic cylinders 128.

Figure 13:
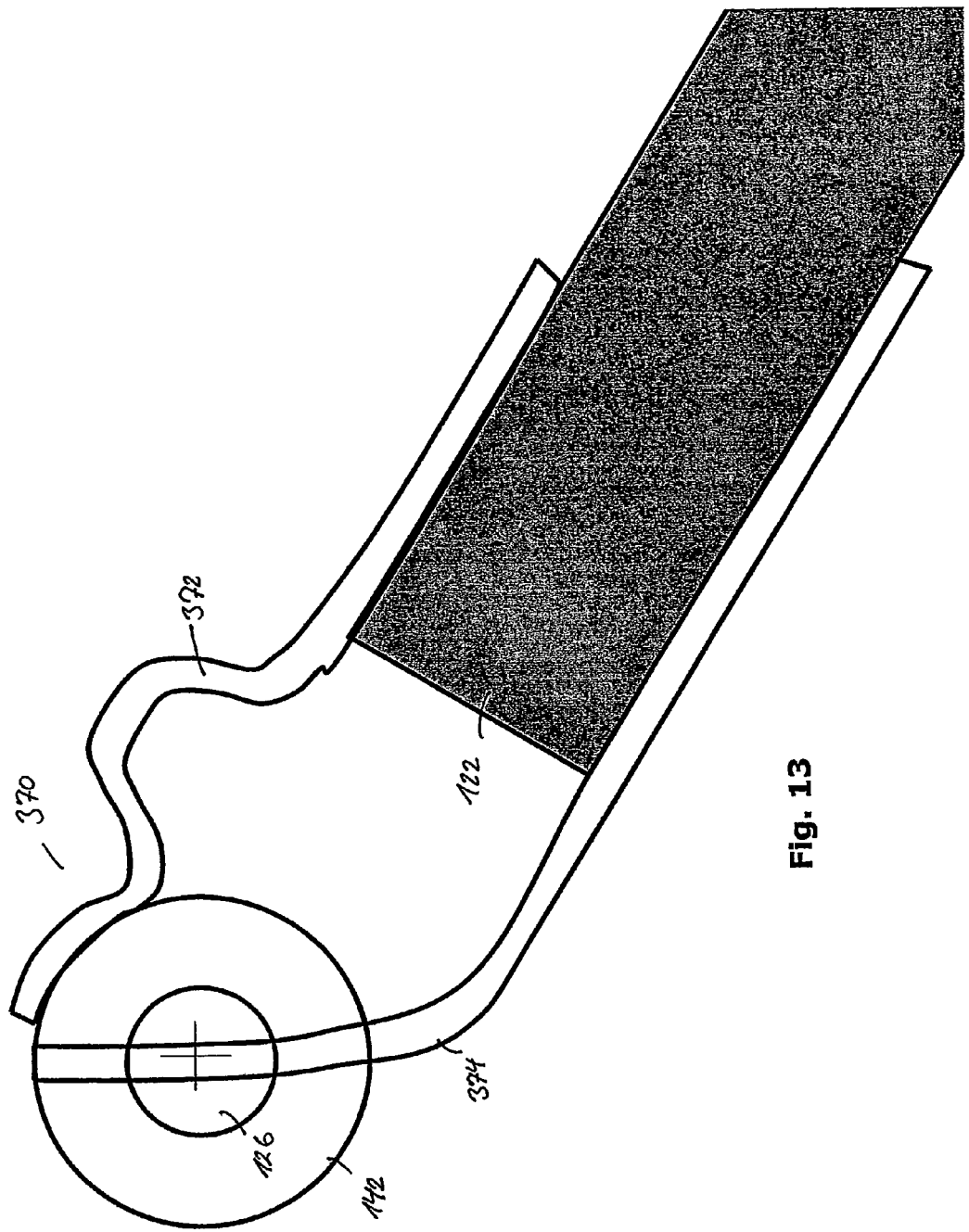

FIG. 13 shows a bearing support for an arm 122, the support comprising two flat springs 372 and 374. The first flat spring 372 increases the torsion stiffness as well as the transverse stiffness of the bearing. The flat springs may be made from carbon fibre materials.

Figure 14:
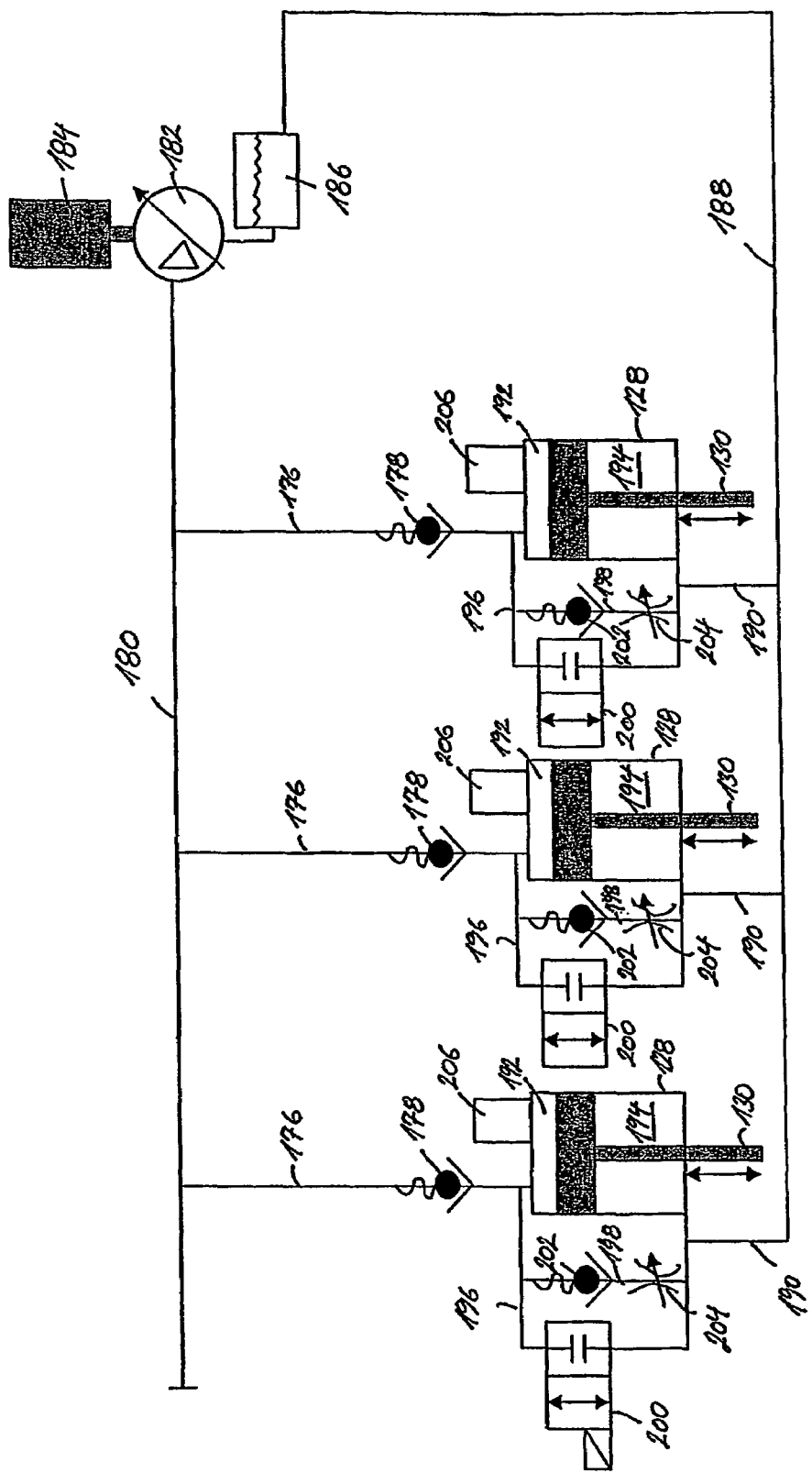
FIG. 14-17 show diagrams of a hydraulic driving system of an embodiment of an apparatus according to the invention.

In the hydraulic diagram of FIG. 14, there is shown a plurality of cylinders 128 with respective pistons 130 which are upwardly and downwardly movable as the arms 122 and floats 124 move in the waves, cf. the above description of FIG. 1. Whereas there are shown three cylinders in the diagram of FIG. 14, it should be understood that the apparatus according to the invention typically comprises a larger number of cylinders, e.g. 60 cylinders. The cylinders 128 are shown as double-acting cylinders connected at their upper ends to feeding conduits 176 for a hydraulic medium of the system. In each feeding conduit 176 there is provided a pressure valve 178. The feeding conduits 176 merge into a common main conduit 180, which feeds into a hydraulic motor 182 with variable volume displacement per revolution. In the feeding conduits 176 and common main conduit 180, there is maintained an operating pressure $p_0$. The pressure $p_0$ may advantageously also be the threshold pressure of valve 178, at which the valve switches between its open and closed state. The hydraulic motor drives an electric generator 184, and at the exit of the hydraulic motor, the hydraulic medium is led to a reservoir 186. From the reservoir 186, the hydraulic medium flows back to the cylinders 128 via a common return conduit 188 and branch return conduits 190.

In each of the cylinders 128, the piston 130 divides the cylinder in upper and lower chambers 192, 194 which are interconnected via conduits 196 and 198. In each of the conduits 196 there is provided a two-way valve 200, and in parallel thereto there is provided, in conduit 198, a pressure valve 202 and a series flow control valve 204. Finally, each cylinder is provided with a control element 206 for determining the position and/or rate of movement of the piston 130 of the cylinder 128.

When the two-way valve 200 is open, the piston 130 may move freely when the arms 122 (see FIG. 1) move in the waves. When the control element 206 determines a certain position and/or rate of movement of the piston 130, a control signal is passed to the valve 200 causing the valve 200 to shut. As the pressure valve 178 is shut, the piston 130 will be locked while the wave continues to rise until the buoyancy of the float is large enough to overcome the operating pressure $p_0$ in the feeding and main conduits 176,180, so as to open the pressure valve 178. It will thus be understood that the float 124 (see FIG. 1) is at least partially submerged in the wave when the valve 178 opens (cf. also the below discussion of FIG. 21). Once the pressure valve 178 has opened, the hydraulic medium is fed to the motor 182. When the float passes the wave crest, the float is still submerged, but the pressure in the upper part 192 of the cylinder 128 drops, and pressure valve 178 shuts. Subsequently, the two-way valve 200 opens, and hydraulic medium is displaced from the lower cylinder part 194 to the upper cylinder part 192, as the float moves down the wave from the wave crest to the wave trough.

It will be appreciated that, due to the large number of cylinders 128, it is at all times ensured that at least two of them, and preferably several, deliver a flow of hydraulic medium to the motor 182. Thereby, an even power output from the generator 184 may be ensured, preferably without any need for frequency converters.

Figure 15:
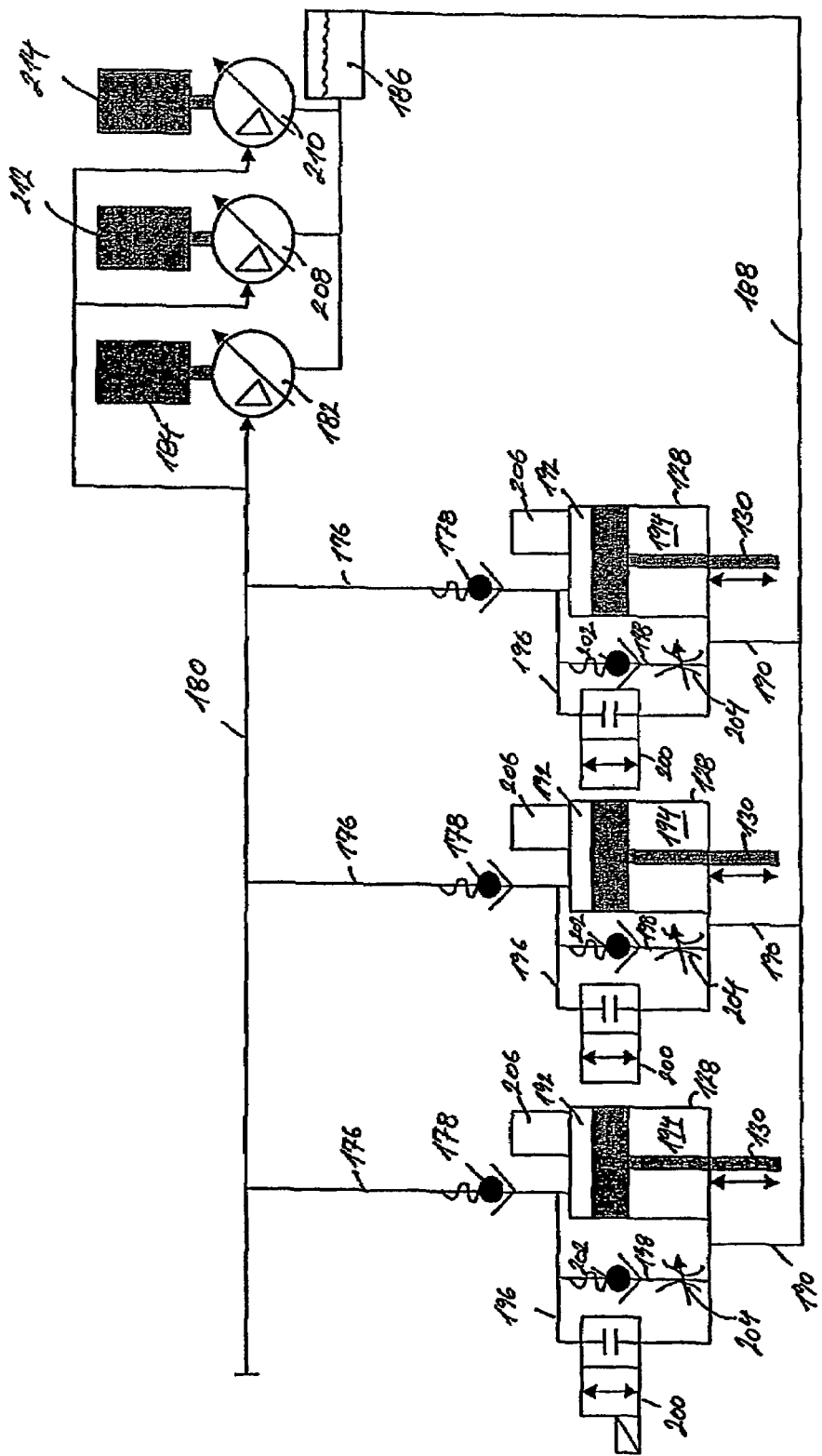

The above description of FIG. 14 also applies to the FIG. 15, however in the embodiment of FIG. 15 there is provided a plurality of hydraulic motors 182,208,210 are provided. Each of the hydraulic motors 182,208,210 is connected to respective electric generators 184,212,214. In the embodiment of FIG. 15, only three hydraulic motors and electric generators are provided, but in other embodiments the wave power apparatus comprises a higher number of motors and generators. For example 5, 10 or 20 motors and generators may be provided. The capacity of the hydraulic motors and their corresponding electric generators may be chosen so as to make it possible generate different levels of energy. In one example, the three generators may be able to produce 0.5 MW, 0.5 MW and 2 MW, respectively. Thus, in order to produce 1 MW, the hydraulic motor of the two 0.5 MW generators may be connected to the common main conduit 180, whereas the third generator should be disconnected from the main conduit 180. At sites where the wave energy is substantially constant over time, the capacity of the generators and their corresponding hydraulic motors may each be chosen to be at the highest possible level in order to reduce the total number of hydraulic motors and generators. At sites at high fluctuation of the wave height and wave frequency, the capacity of the generators may be chosen from a binary principle e.g. 1 MW, 2 MW and 4 MW. By choosing the generators from a binary principle it is possible to couple said generators in and out in using the below pattern so as optimise the utilisation of the wave energy.

| Generator 1 (1 MW) | Generator 2 (2 MW) | Generator 3 (4 MW) | Total output [MW] |
|---|---|---|---|
| On | Off | Off | 1 |
| Off | On | Off | 2 |
| On | On | Off | 3 |
| Off | Off | On | 4 |
| On | Off | On | 5 |
| On | On | On | 6 |

Figure 16:
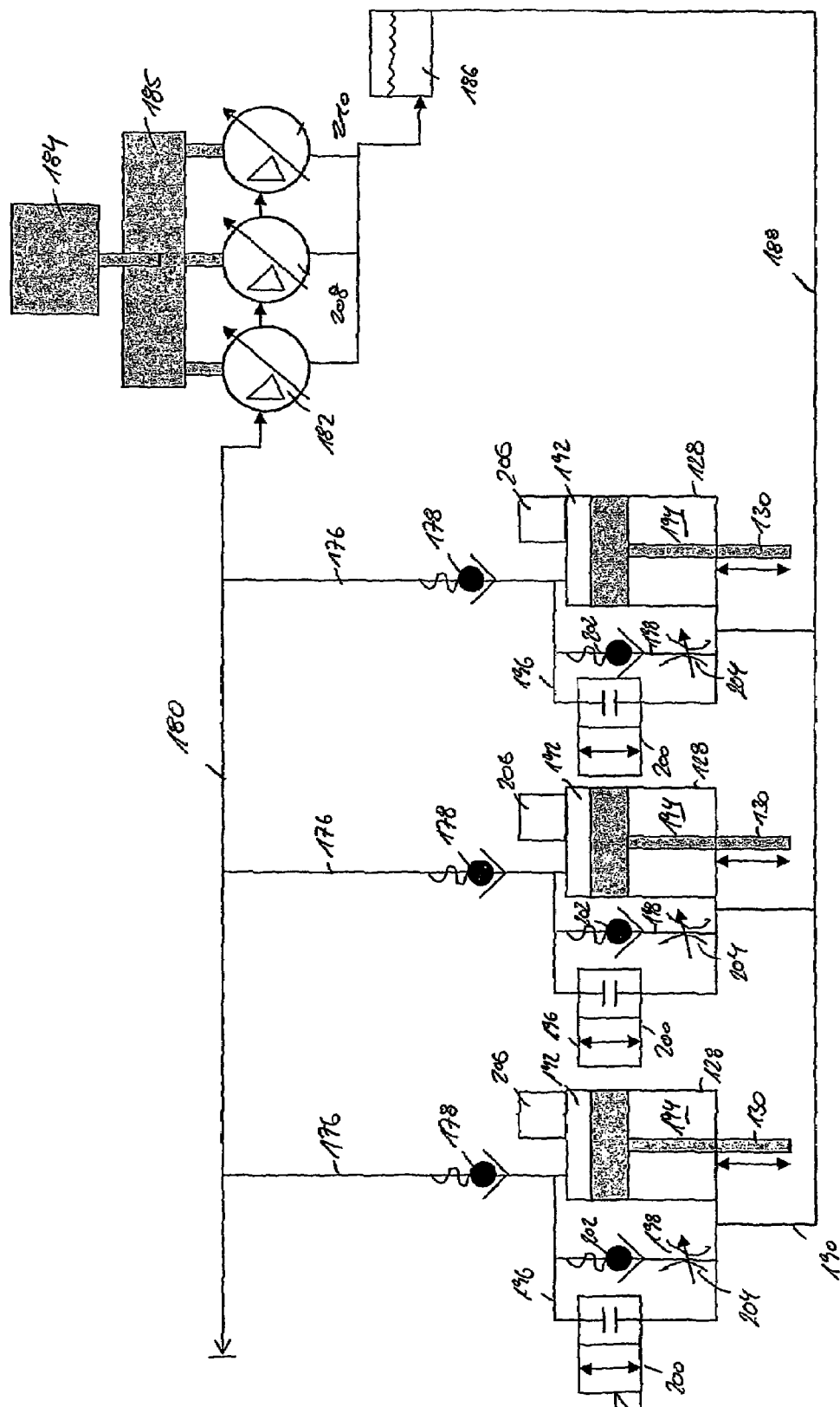
Figure 17:
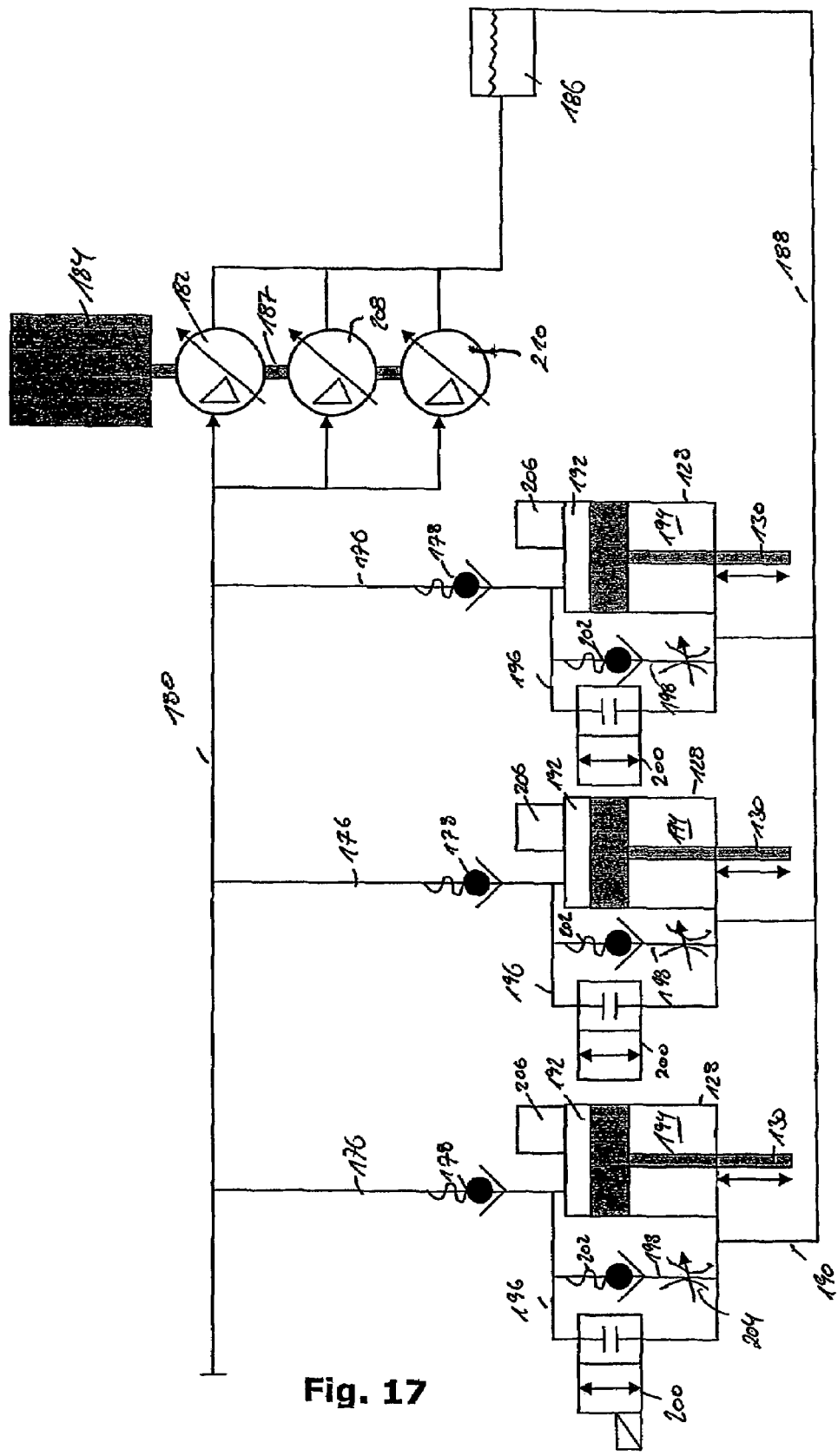

The system of FIG. 16 is similar to the system of FIG. 15, however in the system of FIG. 16 there is only provided one single electric generator 184, which is driven by the hydraulic motors 182, 208 and 210 via a gearbox 185. The hydraulic motors may e.g. drive a toothed rim of a planet gear. Alternatively, as shown in FIG. 17, the hydraulic motors 182, 208 and 210 may drive one common generator 184 via a common, through-going shaft 187.

Figure 18:
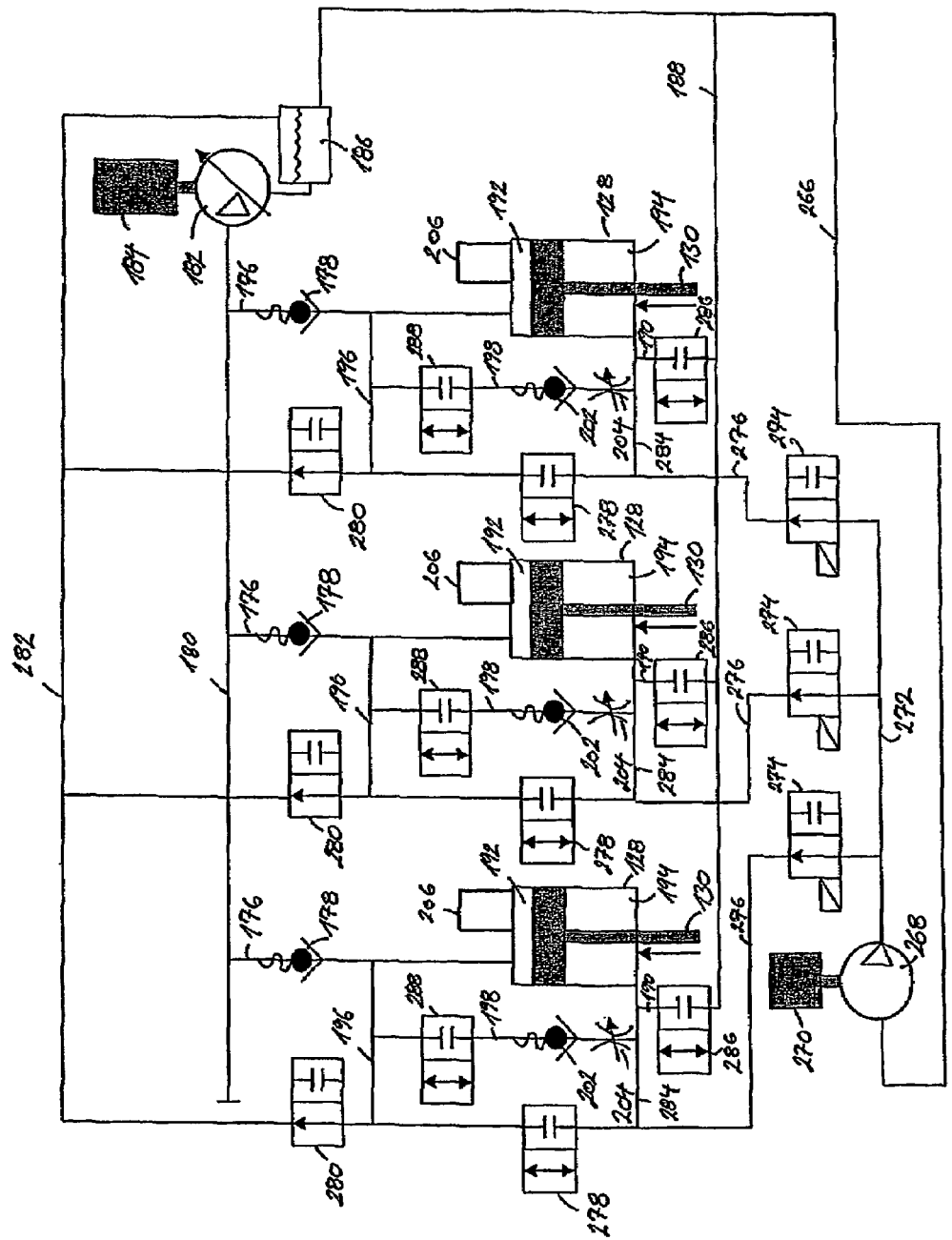
FIG. 18 shows a diagram of a hydraulic lifting system for lifting the floats out of the ocean.

FIG. 18 illustrates a hydraulic lifting system for lifting the floats 124 out of the ocean and for keeping them in an elevated position, in which the waves cannot reach the floats. FIG. 18 also includes a hydraulic driving system similar to the driving system described above in connection with FIGS. 14-17. To the extent that the same or similar elements are incorporated in the driving system depicted in FIG. 18 as those depicted in FIGS. 14-17, the reference numerals of FIG. 6 are used in FIG. 8, and reference is made to the above description of FIGS. 14-17 for a description of such elements and their functionality. The hydraulic lifting system of FIG. 18 is adapted to individually lift one or more floats 124 out of the water and to decouple the cylinders of the lifted floats from hydraulic driving system. The system of FIG. 18 includes, in addition to the common return conduit 188, a conduit 266 connecting the reservoir 186 to a pump 268 driven by a motor 270. Conduit 272 connects the downstream side of the pump 268 to a number of one-way valves 274, the number of one-way valves being equal to the number of floats and cylinders 128. Conduits 276 connect respective downstream sides of the valves 274 to respective two-way valves 278 and one-way valves 280, downstream of which the conduits 276 merge into one common conduit 282. The conduits 276 communicate with the lower cylinder chambers 194 and conduits 198 via conduits 284. Further, the conduits 276 communicate with the upper cylinder chambers 192 and feeding conduits 176 via the conduits 196. Finally, two-way valves 286 are provided in the branch return pipes 190, and two-way valves 288 are provided in conduits 198.

When an arm is to be lifted out of the water, valve 278, valve 286 and valve 288 shut. Valve 274 and 280 open, and the pump 268 may force hydraulic medium into the lower cylinder chamber 194, and the arm associated to the cylinder in question is elevated. Hydraulic medium in the upper cylinder chamber 192 is conducted to the reservoir 186 via valve 280. The control element 206 detects that the arm and with it the piston 130 has reached its desired position, e.g. its uppermost position, and a signal is passed to valves 274 and 280 causing them to shut. The piston 130 is consequently locked, and the arm is secured in a position, in which the float 124 is lifted out of the water. The arm 122 may be further supported by a pawl (not shown) engaging the arm.

Figure 19:
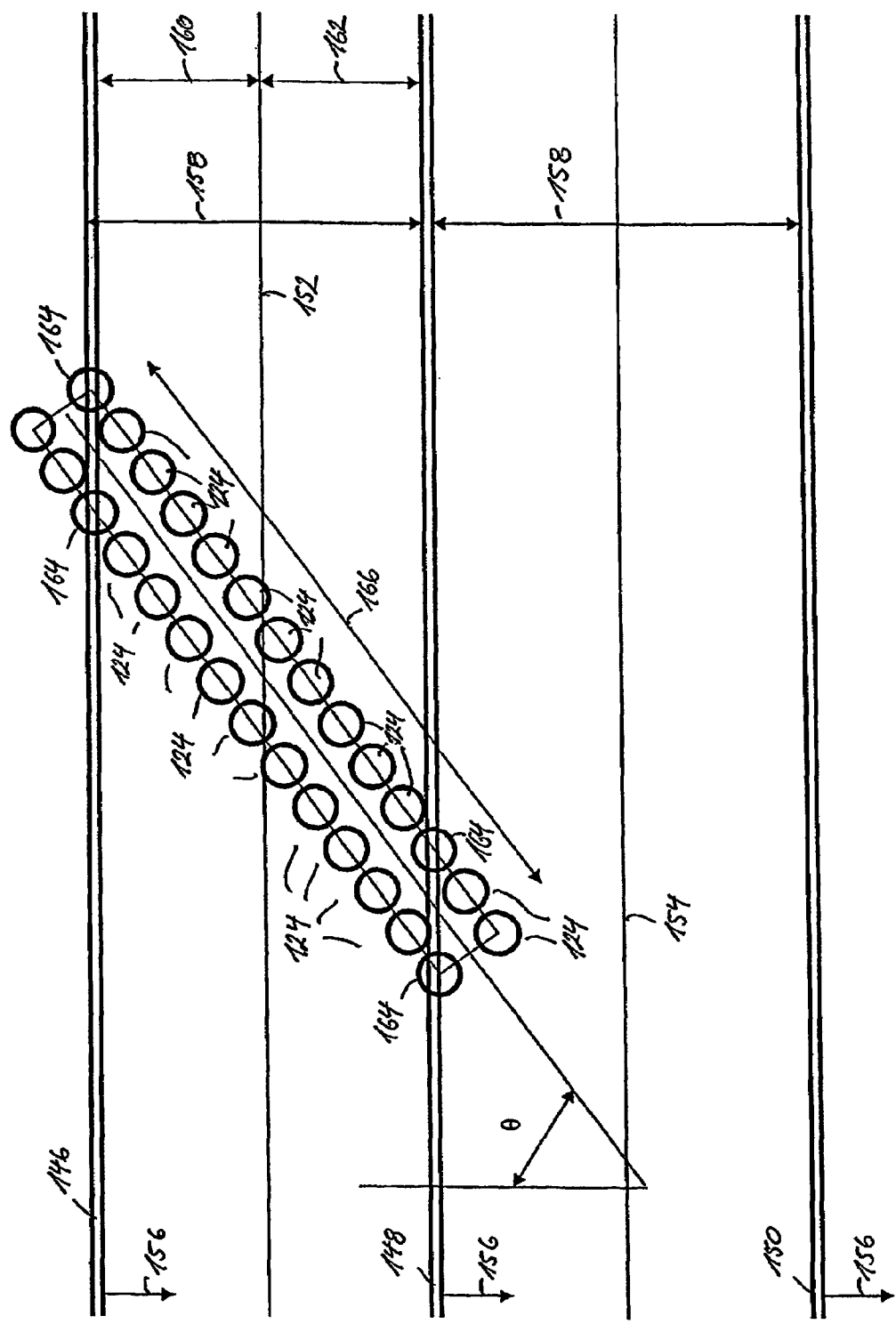
FIG. 19 illustrates a wave power apparatus with an array of floats extending across two wave crests.

FIG. 19 is a diagrammatic illustration showing a plurality of floats 124 and 164 which are coupled to a hydraulic driving system via cylinders as described above in connection with FIGS. 14-18. In FIG. 19, those floats which are located at wave crests 146,148 are referred to by reference numeral 164, whereas all other floats are referred to by reference numeral 124. There is, however, no structural difference between the floats 124 and the floats 164. First, second and third wave crests 146,148,150 are indicated by double lines in FIG. 19, and first and second wave troughs 152,154 are indicated by single lines in the figure. The direction of movement of the wave fronts is indicated by a first arrow 156, the wave length being indicated by a second arrow 158 and the rising and falling parts of the waves are indicated by third and fourth arrows 160,162, respectively. As indicated in FIG. 19, those floats 164, which are at the wave crests 146 and 148 have thus just completed their upwards movement caused by the waves. Those floats 124 which are between the first wave crest 146 and the first wave trough 152 are on their way upward in the wave, whereas those floats which are between the second wave crest 148 and the first wave trough 152 are moving down along a downstream side of the wave. As the array of floats 124, 164 spans over a full wave length, a plurality of floats is on their way upwards in a wave at any moment, whereby it is ensured that a plurality of floats deliver a power contribute to the hydraulic driving system at any time. As described above with reference to FIGS. 14-17, each of the floats actuates a hydraulic cylinder, and hydraulic pressure is created in the main conduit 180 (cf. FIGS. 14-17). As a plurality of the floats are moving upwards at the same time, a plurality of hydraulic cylinders provide hydraulic pressure simultaneously. Accordingly, thanks to the provision of the common main conduit 180 connected to a plurality of cylinders with respective floats and thanks to the extent of the array of floats over at least a full wave length, the pressure fluctuations in the common main conduit 180 and thus the pressure fluctuations at the input to the hydraulic motor 182 or motors 182, 208, 210 may be kept low. As the hydraulic motors 182, 208 and 210 are motors with variable displacement per turn, the rpm of the motors may be kept essentially constant. This in turn confers the effect that the frequency of AC current generated by the generator 184 or generators 184, 212 and 214 is essentially constant, whereby it is achieved that, in preferred embodiments of the invention, AC current may be generated without the need for frequency converters.

In FIG. 19, the wave direction defines an angle θ with respect to the row of floats. The wave direction is parallel to the row of floats when θ=0°. It will be understood that the larger the angle θ is to 0° the longer must be the row of floats in order to ensure that at any given moment at least one float is moved upwards by a wave to deliver a pressure contribute in the common main conduit 180 (cf. FIGS. 14-17) of the hydraulic driving system.

In designing the system the typical wave length and directions of the location should be taken into account in order to ensure a substantially constant hydraulic pressure in the system. In preferred embodiments of the invention, the relationship between the wave direction (angle θ) and the length of the wave power apparatus, i.e. the length spanned by the floats 124, 164, may be determined by the following formula:

$$\text{Length of the wave power apparatus} \geq \frac{\text{wavelength}}{\cos(\theta)}$$

Figure 20:
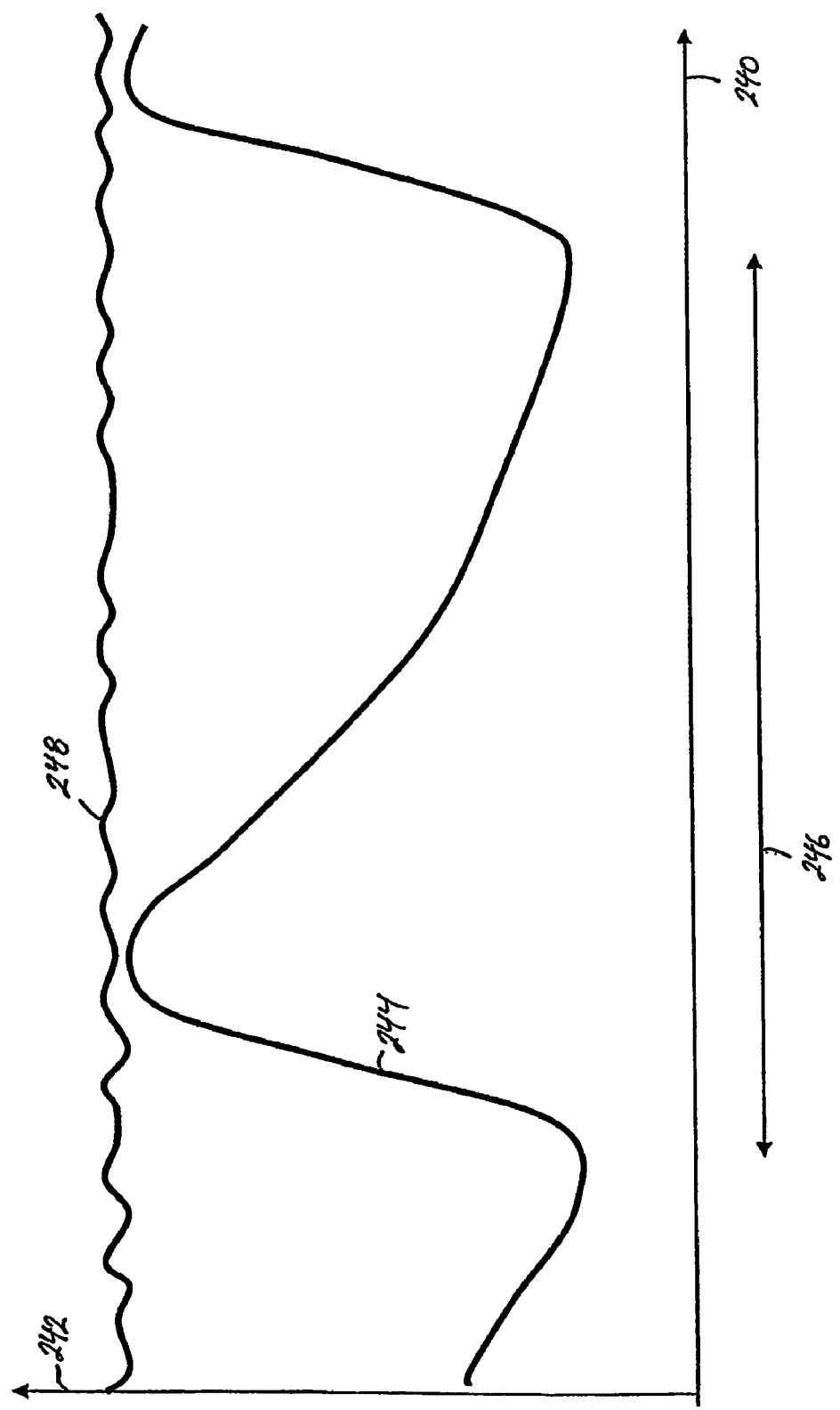
FIG. 20 shows hydraulic pressure as a function of time in a feed line of the hydraulic driving system of a prior art wave power apparatus and in an embodiment of an apparatus according to the present invention, respectively.

FIG. 20 shows the hydraulic pressure 242 in the common main conduit 180 (cf. FIGS. 14-17) as a function of time 240. The first curve 244 shows the hydraulic pressure in a feed line of a typical prior art wave power apparatus with hydraulic cylinders feeding one accumulator with a hydraulic motor. As indicated in FIG. 20, the hydraulic pressure fluctuates with a wave period 246. The hydraulic pressure 248 in an embodiment of the wave power apparatus of the present invention comprising a plurality of arms, floats and cylinders and no accumulators fluctuates with a lower amplitude.

Figure 21:
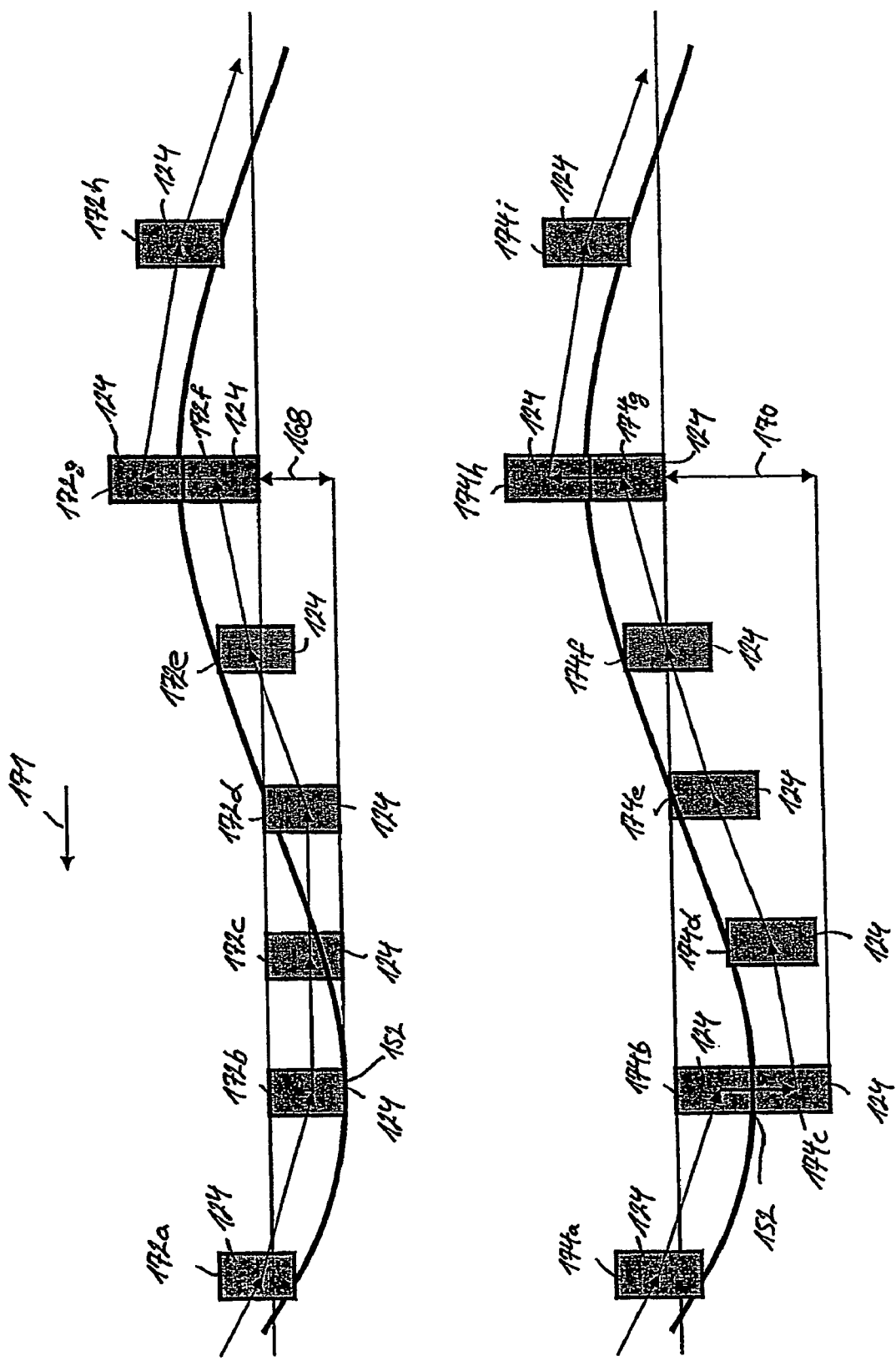
FIG. 21 illustrates two different travel paths of a float across a wave.

FIG. 21 illustrates two different travel paths of a float across a wave which moves in the direction of arrow 171. The upper part of FIG. 21 illustrates a flow path, at which no measures are taken to increase the vertical travel distance the float 124 when the float is passed by a wave. The lower part of FIG. 21 illustrates a flow path, at which the vertical travel distance of the float is increased by actively forcing the float 124 into the water at the wave trough 152.

In the upper part of FIG. 21, at position 172a, the float 124 is moving downwards with the wave until the float reaches the wave trough 152 at position 172b. At this point the hydraulic cylinder is locked as pressure valve 178 shuts (cf. FIGS. 14-17), two-way valve 200 being also shut, and accordingly the float moves horizontally into the wave to position 172d via position 172c. As the wave rises, pressure builds up in the upper chamber 192 of the cylinder 128 and in the conduit upstream of the pressure valve 178 (cf. 14-17). At position 172d, the pressure is sufficient to overcome the threshold pressure of pressure valve 178, which opens, whereby the float 124 is allowed to move upwards in the wave to position 172f via position 172e. During this movement, the hydraulic cylinder 128 of the float 124 feeds hydraulic medium into the common hydraulic conduit 180, whereby a power contribute is delivered to the hydraulic motor 182 or motors 182, 208, 210. At position 172f, when the passing wave is about to descend, the pressure in the feeding conduit 176 drops below the shut-off threshold of pressure valve 178, which shuts. As soon as the pressure valve 178 shuts and two-way valve 200 opens, the float 124 is uncoupled from the common hydraulic conduit 180 and the buoyancy of the float 124 causes it to move essentially vertically out of the water to position 172g. As the wave descends, the float 124 moves downwards with the wave to position 172h, and the float starts a new cycle in the next wave. The float 124 travels a vertical distance 168. From the above description of FIG. 21, it will be appreciated that the power contribute of each individual float 124 and associated cylinder 128 to the hydraulic driving system is conferred during the vertical movement of float.

In order to increase the power output of the wave power apparatus it is thus desirable to increase the vertical travel distance of the float 124. The lower part of FIG. 21 illustrates an alternative travel path of the float 124 across the wave, in which measures are taken to increase the vertical distance travelled by the float 124. At position 174a, the float 124 is descending at the downstream side of a wave. At position 174b, the float 124 has reached the wave trough 152. At this point, the float is forced downwards under the water to position 174c, and pressure valve 178 and two-way valve 200 shut (cf. FIGS. 14-17). As the pressure upstream of the pressure valve 178 exceeds the threshold shut-off pressure of the pressure valve 178, the valve 178 opens, and the float 124 moves to position 174g via 174d, 174e and 174f. At position 174f, pressure valve 178 shuts and two-way valve 202 opens, and the buoyancy of the float 124 causes the float to move essentially vertically out of the water to position 174h, from which the float descends on the downstream side of the wave to position 174i, and the above cycle is repeated. Thanks to the forcing into the water of the float at the wave crest 152, i.e. from position 174b to position 174c, the vertical distance 170 travelled by the float is significantly larger than the vertical distance 168 travelled in embodiments, in which the float is not forced down into the wave at or near a wave trough, cf. the upper part of FIG. 21. Thus, the power contribute of the cylinder 128 of a float 124 is also significantly larger in respect of the path of the lower part of FIG. 21 than in respect of the path of the upper part of FIG. 21.

Figure 22:
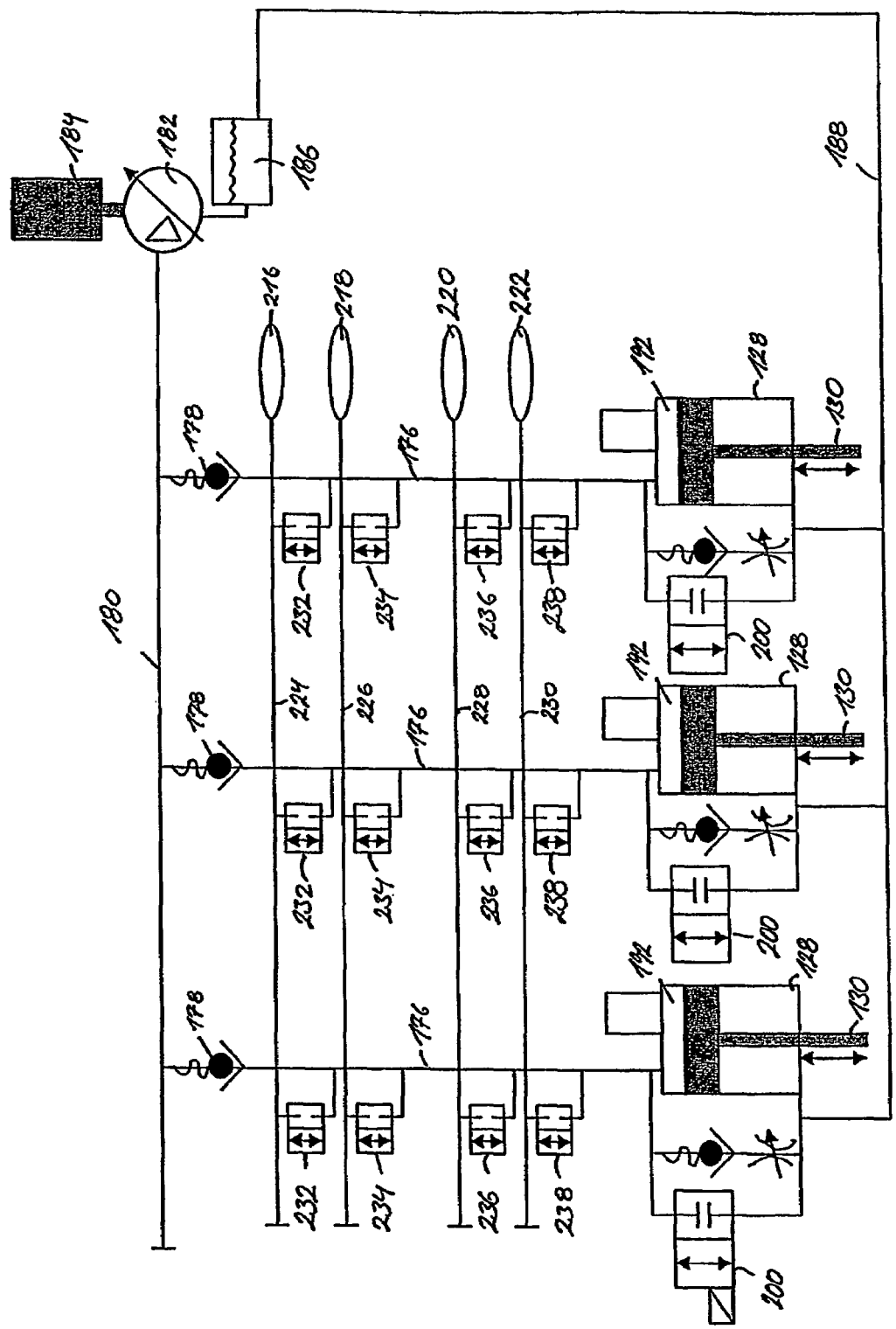
FIG. 22 shows a diagram of a hydraulic driving system with accumulators for forcing the floats into the waves at wave troughs.

Evidently, a net gain in terms of overall power output of the wave power apparatus arises only if the power utilized for forcing the float 124 into the wave at the wave trough 152 is not deducted from the power output of the apparatus. FIG. 22 shows a modified embodiment of the hydraulic driving system of FIG. 14, which may accumulate potential energy released as a float 124 moves vertically out of a wave at or near a wave crest, i.e. from position 174g to position 174h in the lower part of FIG. 21. This energy, which is lost in the embodiments of FIGS. 14-17, is used to force the float 124 into the wave.

More specifically, FIG. 22 shows a hydraulic diagram with first, second, third and fourth accumulators 216, 218, 220, 222 for forcing the floats down under the waves at wave troughs. In addition to the system of FIG. 14, the hydraulic system of FIG. 22 comprises the hydraulic accumulators 216, 218, 220, 222, which are arranged at one end of hydraulic accumulator conduits 224, 226, 228, 230, which are connected to the feeding conduits 176 via first, second, third and fourth two-way valves 232, 234, 236, 238. Once a float has passed a wave crest, the pressure valve 178 shuts as described above in connection with FIG. 14, and the float 124 moves out of the wave from its submerged position in the wave. The hydraulic medium, which is thereby displaced from the upper part 192 of the cylinder, is conducted to the accumulators 216, 218, 220, 222 via the valves 232, 234, 236, 238 and the accumulator conduits 224, 226, 228, 230. In one embodiment, the valves 232, 234, 236, 238 are arranged and controlled such that the first valve 232 shuts at a first pressure p1, p1 being lower than the operating pressure p0 in the main conduit 180. The second valve 234 opens at the first pressure p1 and shuts again at a lower, second pressure p2. The third valve 236 opens at the second pressure p2 and shuts again at a lower, third pressure p3. The fourth valve 238 opens at the third pressure p3 and shuts again at a lower, fourth pressure p4. At a yet lower pressure p5, the two-way valve 200 opens.

At a wave trough, the valve 200 shuts, the fourth two-way valve 238 opens, and the pressure in the fourth accumulator 222 is utilized to force the float under the water. As the fourth two-way valve 238 shuts, the third two-way valve 236 opens, and the pressure in the third accumulator 220 is utilized to force the float further under the water. Hereafter the third two-way valve 236 shuts, and the second two-way valve 234 opens, and the pressure in the second accumulator 218 is utilized to force the float even further under the water. Subsequently, the second two-way valve 234 shuts, and the first two-way valve 232 opens such that the pressure in the first accumulator 216 is used to force the float further under the surface of the water. Finally, the first two-way valve 232 shuts, and the pressure valve 178 opens.

It will thus be appreciated that at least a portion of the potential energy released as the float 124 moves vertically out of the wave from position 174g to position 174h (cf. the lower part of FIG. 21) may be utilized for forcing the float into the water at a wave trough 152 in order to increase the power output of the wave power apparatus. Accordingly, the forcing down of a float by in the manner described above may be regarded as a way of utilizing the potential energy released at wave crests, which energy would otherwise be lost.

There may be provided more than four accumulators 216, 218, 220 and 222. For example, there may be provided six, eight, ten, twelve, twenty or even more accumulators.

Figure 23:
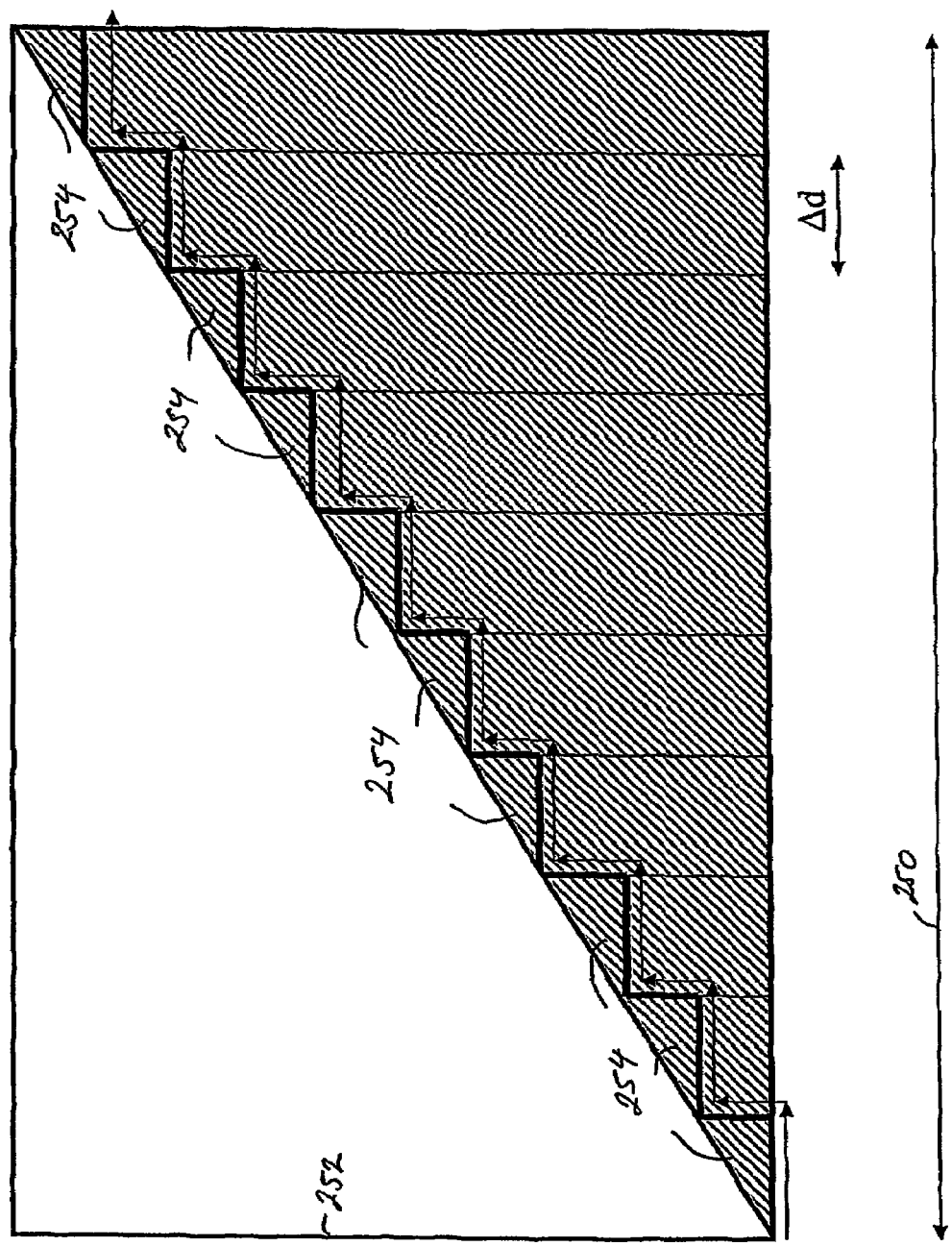
FIG. 23 illustrates the stepwise accumulation of energy in a hydraulic storage system.

FIG. 23 generally shows a graphical representation of the accumulation of energy in N steps, i.e. in N accumulators corresponding to the accumulators 216, 218, 220 and 222 of FIG. 22. The first axis indicates the vertical displacement do 250 of the float in water, and the second axis indicates the force $F_0$ 252. The area of the hatched triangle covering half of the diagram of FIG. 23 indicates the ideal maximal energy, which is available. However, in order to utilize this energy, the system should comprise an infinitive number of steps, i.e. an infinite number of accumulators. In other words, the larger the pressure difference is between two steps, the larger is the loss of energy for each step. In FIG. 23, the energy loss is indicated by hatched triangles 254. Each triangle indicates that the float is displaced a vertical distance $\Delta d$. The area of each of the small triangles is half height times length. Thus, the loss at each step may be determined by the following formula:

$$A_{loss\ per\ step} = \frac{1}{2} \cdot \left(\frac{F_0}{d_0} \cdot \Delta d\right) \cdot \Delta d = \frac{F_0 \Delta d^2}{2d_0}$$

Wherein
$F_0$ is the excursion force when the float is forced the distance $d_0$ under the water,
$\Delta d = d_0/N$, and
N is the number of steps.

The total loss of energy i.e. the sum of the small triangles, is defined by the following formula:

$$\sum A_{loss\ per\ step} = \frac{1}{2} \cdot \left(\frac{F_0}{d_0}\right) \cdot \left(\frac{d_0}{N}\right) \cdot \left(\frac{d_0}{N}\right) \cdot N = \frac{F_0 d_0}{2N}$$

Accordingly, the larger the number of step N, the smaller is the total loss of energy.

Figure 24:
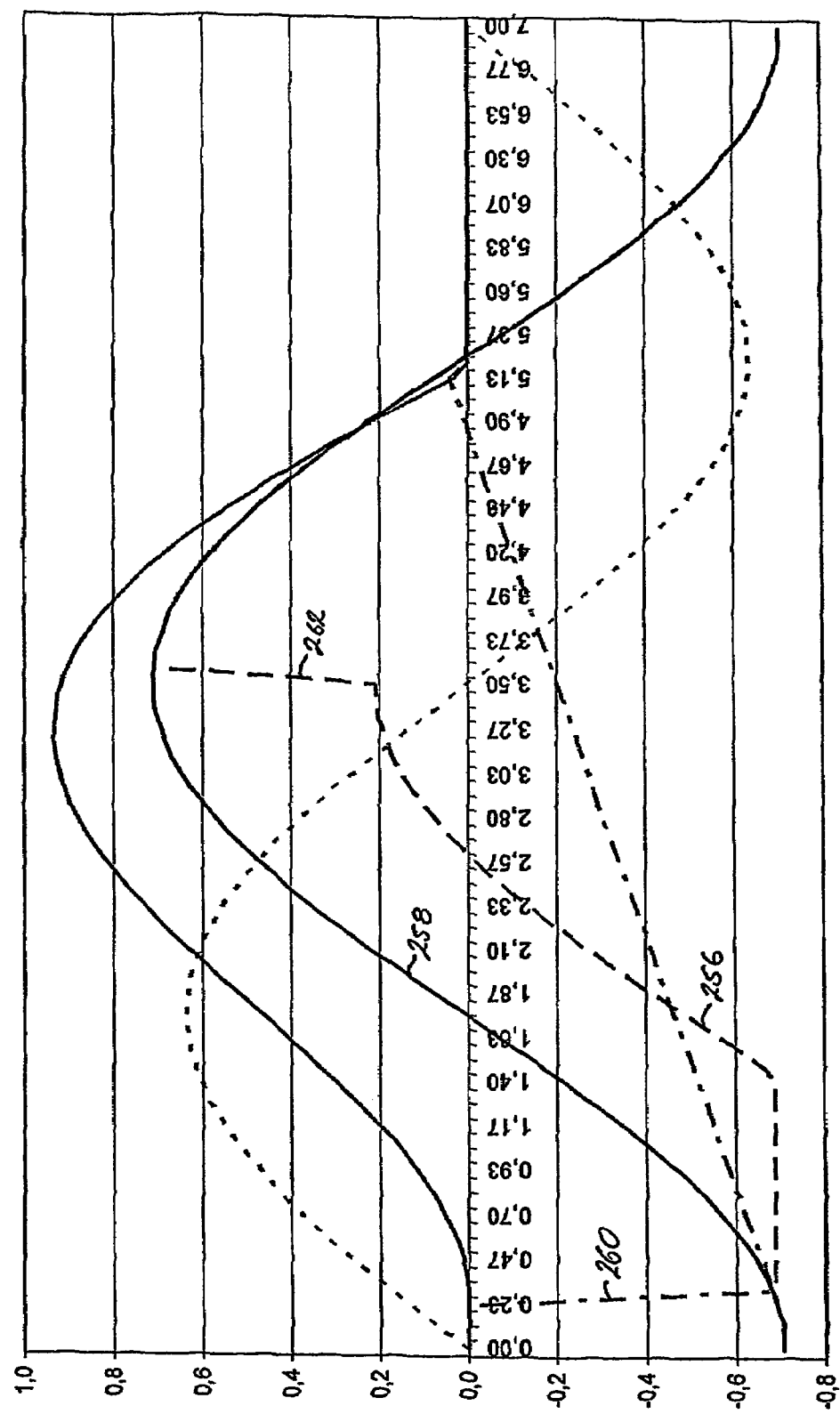
FIGS. 24 and 25 are diagrammatic illustrations of the movement of waves and floats.
Figure 25:
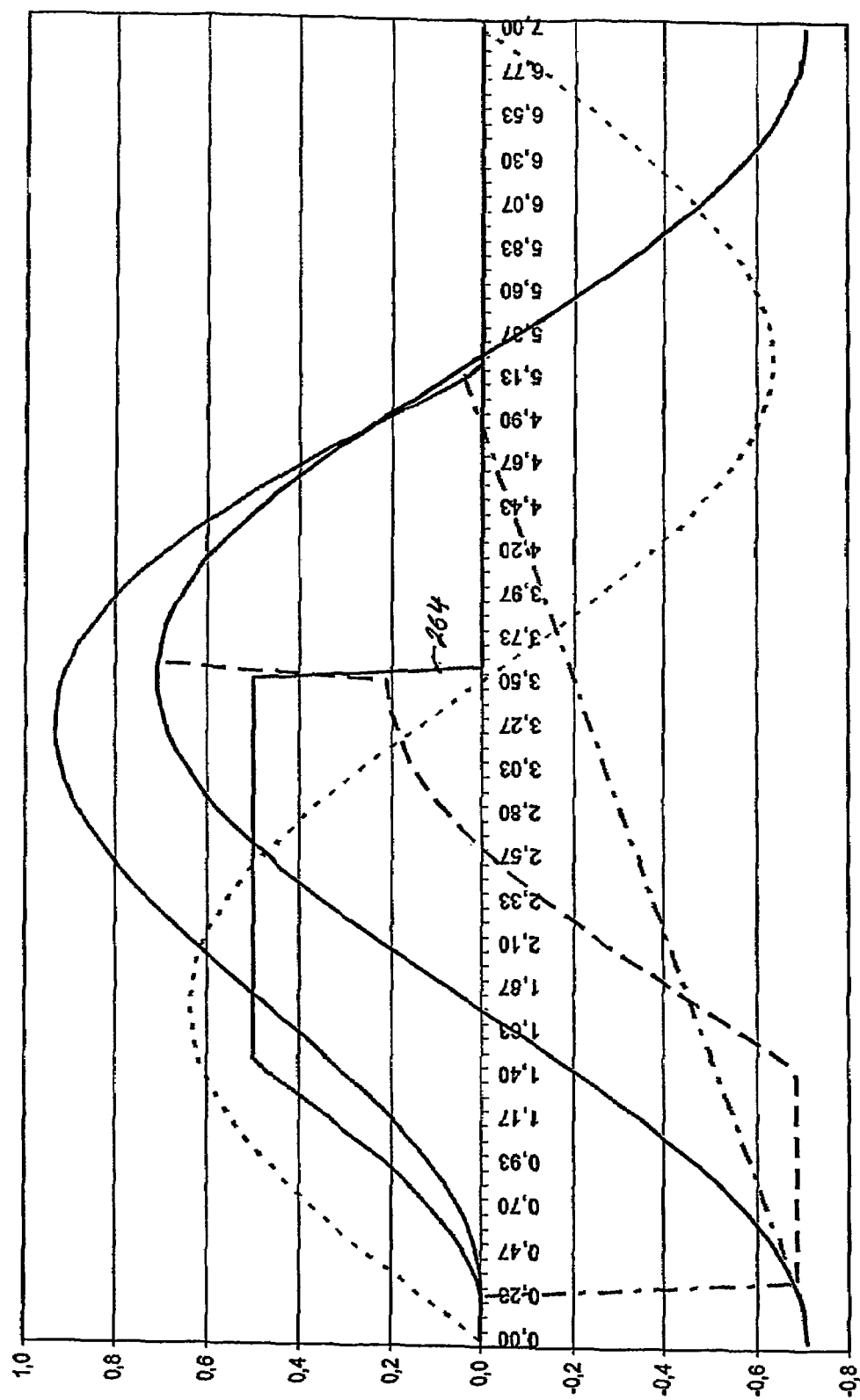

The effect of the accumulators discussed above in connection with FIGS. 22 and 23 is shown in FIG. 24, in which curve 256 shows the movement of the float in the wave as a function of time, and curve 258 shows the shape of a wave as a function of time. There is a partial overlap of the curves 256 and 258 at the downstream, i.e. descending, side of a wave. At 260, two-way valve 200 shuts (cf. FIG. 22) while pressure valve 178 is also shut, and the float is locked. At 262, the float moves out of the wave and delivers energy to the accumulators 216, 218, 220 and 222. In FIG. 25, curve 264 shows the actual depression of the float in the wave.

We claim:

1. A wave power apparatus comprising at least one arm, the arm being rotationally supported at one end by a shaft and carrying a float at its other end, which is opposite to the supported end, so that a translational movement of the float caused by a wave results in rotation of the arm around the shaft, the apparatus comprising power conversion means for converting power transmitted from the wave to the arms into electric power, characterised by
a hydraulic lifting system for lifting the float out of the ocean and for locking the float in an upper position above the ocean surface.

2. A wave power apparatus according to claim 1, wherein the float is pivotally joined to the arm.

3. A wave power apparatus according to claim 1 or 2, comprising a plurality of arms, each arm being supported by at least two bearings which are arranged along a common centre axis, which is coincident with an axis of rotation of the arm, the bearings being offset from the centre axis, so as to counteract radial and axial forces.

4. A wave power apparatus according to claim 3, wherein the bearings are pre-stressed in an axial direction.

5. A wave power apparatus according to claim 3 or 4, wherein each of the bearings comprises an inner and an outer ring or cylinder, the inner ring being secured to a rotational shaft of the arm, and the outer ring being secured to a fixed support, the bearing further comprising a flexible material between the inner and the outer ring.

6. A wave power apparatus according to claim 5, wherein the flexible material comprises at least one cavity or perforation.

7. A wave power apparatus according to claim 5 or 6, wherein the flexible material comprises at least one spring member, such as a flat spring.

8. A wave power apparatus according to any of the preceding claims, wherein the at least one arm comprises a plurality of arms which are arranged in a row such that a wave passing the row of arms causes the arms to successively pivot around the shaft, the arms being arranged at mutual distances, so that at all times at least two of the arms simultaneously deliver a power contribute to the power conversion means, the power conversion means comprising a hydraulic actuator associated with each arm, the hydraulic actuators feeding a hydraulic medium into at least one hydraulic motor via common hydraulic conduits.

9. A wave power apparatus according to claim 8, wherein the row of arms is oriented such with respect to the wave heading that the row forms an angle of within +/−60° with respect to the heading.

10. A wave power apparatus according to claim 8 or 9, wherein each of the arms intermittently transmits power to the power conversion means when a wave passes the float of the arm, the arms and floats being arranged with such mutual distances that, at all times, at least two arms and floats simultaneously deliver a power contribute to the power conversion means.

11. A wave power apparatus according to any of the preceding claims, wherein buoyancy of the float is at least 10 times its dry weight.

12. A wave power apparatus according to any of the preceding claims, wherein the diameter of the float is at least 5 times its height.

13. A wave power apparatus according to any of the preceding claims, wherein the plurality of arms comprises at least five arms per wavelength of waves.

14. A wave power apparatus according to any of the preceding claims, wherein the plurality of arms comprises at least five arms spanning over a total length of 50-200 m.

15. A wave power apparatus according to any of the preceding claims, wherein the arms and the floats are made from a material which has a density of at most 1000 kg/m3.

16. A wave power apparatus according to any of the preceding claims, wherein the power conversion means comprises a hydraulic driving system with at least one hydraulically driven motor.

17. A wave power apparatus according to claim 16, wherein each arm is connected to the hydraulic driving system by means of at least one actuator which causes a hydraulic medium of the hydraulic driving system to be displaced into one or more mutual motors, the actuators being arranged to displace the hydraulic medium to the motor(s) via common hydraulic conduits.

18. A wave power apparatus according to claim 17, wherein the at least one actuator of each arm comprises a double-acting cylinder.

19. A wave power apparatus according to claim 18, wherein the double-acting cylinder forms part of the hydraulic lifting system, so that the cylinder is controllable to lift the float out of the ocean.

20. A wave power apparatus according to claim 18 or 19, wherein the hydraulic driving system comprises at least one hydraulic accumulator for intermittently storing energy in the hydraulic driving system, and wherein the hydraulic driving system is controllable to release the energy stored In the accumulator, when a float is passed by a wave trough, so as to force the float carried by the arm into the wave.

21. A wave power apparatus according to claim 17 and 20, wherein the hydraulic medium is fed to the hydraulic accumulator system via the common hydraulic conduits.

22. A wave power apparatus according to any of claims 18-21, wherein each cylinder is provided with a sensor for determining a position and/or rate of movement of the cylinder's piston, the sensor being arranged to transmit a signal to a control unit of the cylinders and associated valves, so that the transmission of energy from the individual cylinders to the remaining parts of the hydraulic driving system is individually controllable in response to the signal representing the individual cylinder's piston's position and/or rate of movement.

23. A wave power apparatus according to any of the preceding claims, wherein the shaft and the power conversion means are supported by a supporting structure which is anchored to the sea floor by means of a suction anchor.

24. A wave power apparatus according to claim 23, wherein the supporting structure is anchored to the sea floor by means of a suction anchor and/or a gravitational support.

25. A power apparatus according to claim 23 or 24, wherein the supporting structure comprises a truss structure, and wherein the suction anchor is arranged in a first nodal point of the truss structure.

26. A wave power apparatus according to claim 25, wherein the supporting structure comprises a truss structure, and wherein the at least one arm is supported by the truss structure in a second nodal point thereof.

27. A wave power apparatus according to claim 26, wherein said second nodal point is arranged at a summit of a triangular substructure of the truss structure, and wherein the triangular substructure defines two vertices at the sea floor, with an anchor in each of the corners.

28. A wave power apparatus according to claim 27, wherein the truss structure comprises a polygonal substructure, preferably a rectangular substructure, arranged above the triangular substructure.

* * * * *

UNITED STATES PATENT AND TRADEMARK OFFICE
CERTIFICATE OF CORRECTION

PATENT NO. : 7,579,704 B2
APPLICATION NO. : 10/575726
DATED : August 25, 2009
INVENTOR(S) : Steenstrup et al.

Page 1 of 4

It is certified that error appears in the above-identified patent and that said Letters Patent is hereby corrected as shown below:

IN THE CLAIMS:

Replace claims 1-28, at column 16, line 66, through column 18, line 65, with claims 1-28 attached hereto.

-- 1. A wave power apparatus comprising:

- at least one arm, which is rotationally supported at one end by a shaft and carrying a float at its other end, which is opposite to the supported end, so that a translational movement of the float caused by a wave results in rotation of the arm around the shaft,

- power conversion means for converting power transmitted from the wave to the at least one arm into electric power by means of a hydraulic driving system with at least one hydraulically driven motor, and

- a hydraulic lifting system for lifting the float out of the ocean and for locking the float in an upper position above the ocean surface, <u>characterised in that</u>

- said at least one arm comprises a plurality of rotationally supported arms, each of which carries a float,

- each arm being connected to the hydraulic driving system by means of at least one actuator which causes a hydraulic medium of the hydraulic driving system to be displaced into one or more mutual motors, the actuators being arranged to displace the hydraulic medium to the motor(s) via common hydraulic conduits, and

- the hydraulic lifting system is adapted to individually lift each float out of the ocean.

Signed and Sealed this
Twenty-seventh Day of March, 2012

David J. Kappos
*Director of the United States Patent and Trademark Office*

2. A wave power apparatus according to claim 1, wherein the float is pivotally joined to the arm.

3. A wave power apparatus according to claim 1, comprising a plurality of arms, each arm being supported by at least two bearings which are arranged along a common centre axis, which is coincident with an axis of rotation of the arm, the bearings being offset from the centre axis, so as to counteract radial and axial forces.

4. A wave power apparatus according to claim 3, wherein the bearings are pre-stressed in an axial direction.

5. A wave power apparatus according to claim 3, wherein each of the bearings comprises an inner and an outer ring or cylinder, the inner ring being secured to a rotational shaft of the arm, and the outer ring being secured to a fixed support, the bearing further comprising a flexible material between the inner and the outer ring.

6. A wave power apparatus according to claim 5, wherein the flexible material comprises at least one cavity or perforation.

7. A wave power apparatus according to claim 5, wherein the flexible material comprises at least one spring member, such as a flat spring.

8. A wave power apparatus according to claim 1, wherein the at least one arm comprises a plurality of arms which are arranged in a row such that a wave passing the row of arms causes the arms to successively pivot around the shaft, the arms being arranged at mutual distances, so that at all times at least two of the arms simultaneously deliver a power contribute to the power conversion means, the power conversion means comprising a hydraulic actuator associated with each arm, the hydraulic actuators feeding a hydraulic medium into at least one hydraulic motor via common hydraulic conduits.

9. A wave power apparatus according to claim 8, wherein the row of arms is oriented such with respect to the wave heading that the row forms an angle of within +/- 60° with respect to the heading.

10. A wave power apparatus according to claim 8, wherein each of the arms intermittently transmits power to the power conversion means when a wave passes the float of the arm, the arms and floats being arranged with such mutual distances that, at all times, at least two arms and floats simultaneously deliver a power contribute to the power conversion means.

11. A wave power apparatus according to claim 1, wherein buoyancy of the float is at least 10 times its dry weight.

12. A wave power apparatus according to claim 1, wherein the diameter of the float is at least 5 times its height.

13. A wave power apparatus according to claim 1, wherein the plurality of arms comprises at least five arms per wavelength of waves.

14. A wave power apparatus according to claim 1, wherein the plurality of arms comprises at least five arms spanning over a total length of 50 – 200 m.

15. A wave power apparatus according to claim 1, wherein the arms and the floats are made from a material which has a density of at most 1000 kg/m3.

16. A wave power apparatus according to claim 1, wherein the at least one actuator of each arm comprises a double-acting cylinder.

17. A wave power apparatus according to claim 16, wherein the double-acting cylinder forms part of the hydraulic lifting system, so that the cylinder is controllable to lift the float out of the ocean.

18. A wave power apparatus according to claim 16, wherein the hydraulic driving system comprises at least one hydraulic accumulator for intermittently storing energy in the hydraulic driving system, and wherein the hydraulic driving system is controllable to release the energy stored in the accumulator, when a float is passed by a wave trough, so as to force the float carried by the arm into the wave.

19. A wave power apparatus according to claim 18, wherein the hydraulic medium is fed to the hydraulic accumulator system via the common hydraulic conduits.

20. A wave power apparatus according to claim 16, wherein each cylinder is provided with a sensor for determining a position and/or rate of movement of the cylinder's piston, the sensor being arranged to transmit a signal to a control unit of the cylinders and associated valves, so that the transmission of energy from the individual cylinders to the remaining parts of the hydraulic driving system is individually controllable in response to the signal representing the individual cylinder's piston's position and/or rate of movement.

21. A wave power apparatus according to claim 1, wherein the shaft and the power conversion means are supported by a supporting structure which is anchored to the sea floor by means of a suction anchor.

22. A wave power apparatus according to claim 21, wherein the supporting structure is anchored to the sea floor by means of a suction anchor and/or a gravitational support.

23. A power apparatus according to claim 21, wherein the supporting structure comprises a truss structure, and wherein the suction anchor is arranged in a first nodal point of the truss structure.

24. A wave power apparatus according to claim 23, wherein the supporting structure comprises a truss structure, and wherein the at least one arm is supported by the truss structure in a second nodal point thereof.

25. A wave power apparatus according to claim 24, wherein said second nodal point is arranged at a summit of a triangular substructure of the truss structure, and wherein the triangular substructure defines two vertices at the sea floor, with an anchor in each of the corners.

26. A wave power apparatus according to claim 25, wherein the truss structure comprises a polygonal substructure, preferably a rectangular substructure, arranged above the triangular substructure.

27. A wave power apparatus according to claim 21, wherein the supporting structure comprises a ballast for providing a downward force on the supporting structure, the ballast being arranged above sea level.

28. A wave power apparatus according to claim 27, wherein the ballast comprises at least one ballast tank or ballast container. --